(12) United States Patent
Raussendorf et al.

(10) Patent No.: US 7,277,872 B2
(45) Date of Patent: Oct. 2, 2007

(54) METHOD FOR QUANTUM COMPUTING

(76) Inventors: Robert Raussendorf, Kazmairstraae 47, 80333 München (DE); Hans Briegel, Wendelsteinring 13, 85737 Ismaning (DE)

( * ) Notice: Subject to any disclaimer, the term of this patent is extended or adjusted under 35 U.S.C. 154(b) by 676 days.

(21) Appl. No.: 10/156,537

(22) Filed: May 28, 2002

(65) Prior Publication Data

US 2003/0055513 A1    Mar. 20, 2003

Related U.S. Application Data

(63) Continuation of application No. PCT/EP01/11175, filed on Sep. 26, 2001.

(30) Foreign Application Priority Data

Sep. 26, 2000  (EP) ................................. 00121024
May 23, 2001  (EP) ................................. 01112629

(51) Int. Cl.
G06F 15/18       (2006.01)
(52) U.S. Cl. ............................. 706/14; 706/12; 706/45
(58) Field of Classification Search ................. 706/14, 706/12, 45
See application file for complete search history.

(56) References Cited

U.S. PATENT DOCUMENTS 5,768,297 A * 6/1998 Shor .......................... 714/763

OTHER PUBLICATIONS

Ivan H. Deutsch et al, Quantum Computing with Neutral Atoms in an Optical Lattice, Mar. 6, 2000, University of New Mexico, 925-943.*
T. Calarco et al, Quantum Computing with Trapped Particles in Microscopic Potentials, Apr. 12, 2000, University of Innsbruck, 945-955.*
G. J. Milburn, Quantum Computing Using a Neutral Atom Optical Lattice: Jun. 3, 2000, University of Queensland, 957-964.*
J. P. Rawling, Orthologic and Quantum Logic: Models and Computational Elements, University of Missouri, 721-751.*
S.C. Benjamin et al.: "Cellular structures for computation in the quantum regime", *Physical Review A*, vol. 60, No. 6, Dec. 1999, pp. 4334-4337.
Wolfgang Porod: "Quantum-dot Devices and Quantum-dot Cellular Automata", *J. Franklin Inst.*, vol. 334B, No. 5,6, 1997, pp. 1147-1175.
S. N. Molotkov et al.: "Single-electron computing: Quantum dot logic gates", *JETP*, vol. 83, No. 4, Oct. 1996, pp. 794-802.
Robert B. Griffiths et al.: "Semiclassical Fourier Transform for Quantum Computation", *Physical Review Letters*, vol. 76, No. 17, Apr. 22, 1996, pp. 3228-3231.
M. A. Nielsen et al.: "Programmable Quantum Gate Arrays", *Physical Review Letters*, vol. 79, No. 2, Jul. 14, 1997, pp. 321-324.
Ivan H. Deutsch et al.: "Quantum-state control in optical lattices", *Physical Review A*, vol. 57, No. 3, Mar. 1998, pp. 1972-1986.
Gavin K. Brennen et al.: "Quantum Logic Gates in Optical Lattices", *Physical Review Letters*, vol. 82, No. 5, Feb. 1, 1999, pp. 1060-1063.
D. Jaksch et al.: "Entanglement of Atoms via Cold Controlled Collisions", *Physical Review Letters*, vol. 82, No. 9, Mar. 1, 1999, pp. 1975-1978.

(Continued)

*Primary Examiner*—Joseph P Hirl
(74) *Attorney, Agent, or Firm*—Laurence A. Greenberg; Werner H. Stemer; Ralph E. Locher

(57) ABSTRACT

A method for quantum computing uses entangled resource states which include in particular a class of highly entangled multi-particle states. These so-called cluster states can serve as a quantum computer. The resource states can be implemented with ultra-cold atoms in optical lattices or similar systems. A universal set of quantum gates, the CNOT gate and arbitrary one-system rotations, can be implemented by performing one-system measurements only. Further, a way of quantum information processing beyond the network scheme is provided.

20 Claims, 10 Drawing Sheets

OTHER PUBLICATIONS

Daniel Gottesman et al.: "Demonstrating the viability of universal quantum computation using teleportation and single-qubit operations", *Nature*, vol. 402, Nov. 25, 1999, pp. 390-393.

A.M. Steane et al.: "Quantum Computing with Trapped Ions, Atoms and Light", *Fortschr. Phys.*, vol. 48, 2000, No. 9-11, pp. 839-858.

Ivan H. Deutsch et al. : "Quantum Computing with Neutral Atoms in an Optical Lattice", *Fortschr. Phys.*, vol. 48, 2000, No. 9-11, pp. 925-943.

T. Calarco et al.: "Quantum Computing with Trapped Particles in Microscopic Potentials", *Fortschr. Phys.*, vol. 48, 2000, No. 9-11, pp. 945-955.

G. J. Milburn: "Quantum Computing Using a Neutral Atom Optical Lattice: An Appraisal", *Fortschr. Phys.*, vol. 48, 2000, No. 9-11, pp. 957-964.

E. Knill: "Efficient Linear Optics Quantum Computation", *arXiv:quant-ph/0006088 vl*, Jun. 20, 2000, pp. 1-8.

\* cited by examiner cluster state before meas.

information flow quantum gate steps 1,2

$|t,c\rangle_{out} = |0\rangle_{c,out}|0\rangle_{t,out} + |1\rangle_{c,out}|1\rangle_{t,out}$ ○: unwanted unitary ops $\in \{\sigma_x, \sigma_y, \sigma_z\}$

FIG 9a
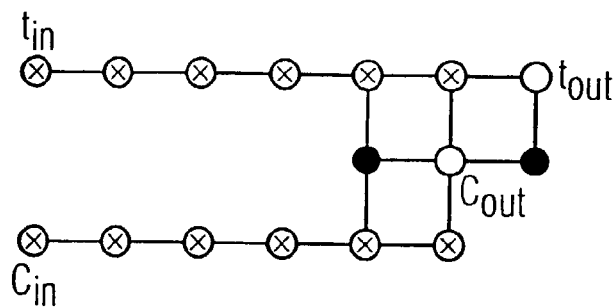
FIG 9b
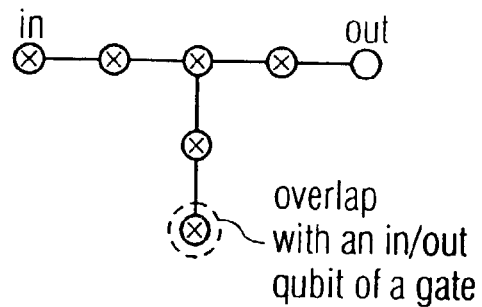
FIG 9c
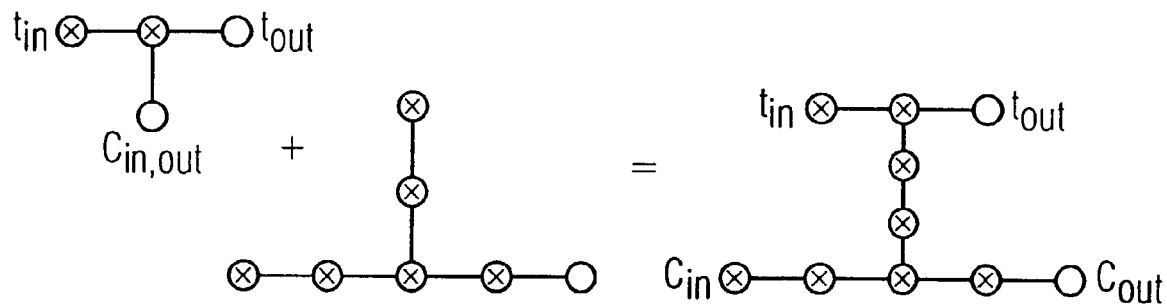
FIG 10
- x-meas.
- y-meas.
- output
- input
FIG 11a
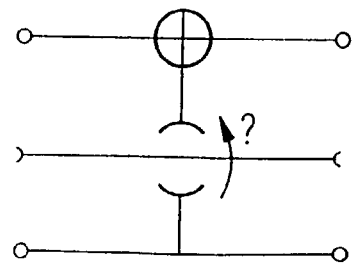
FIG 11b
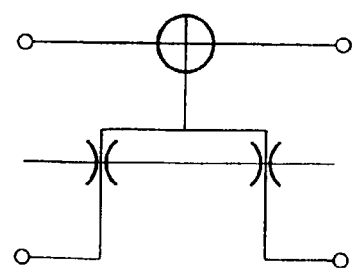

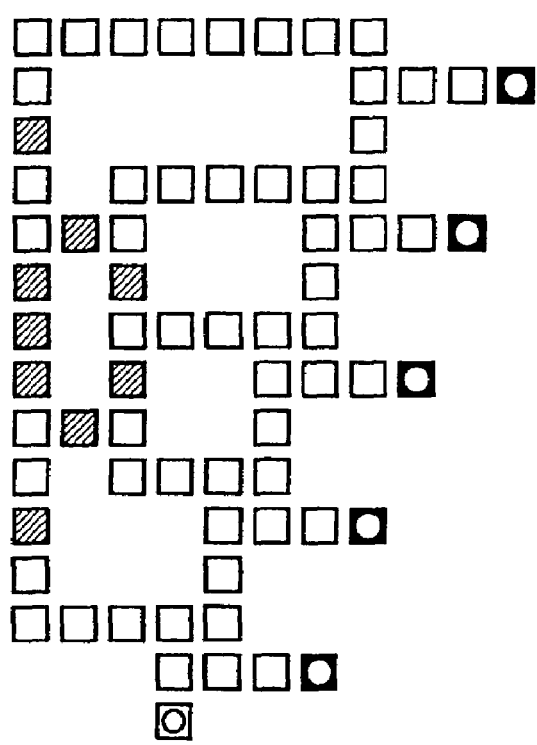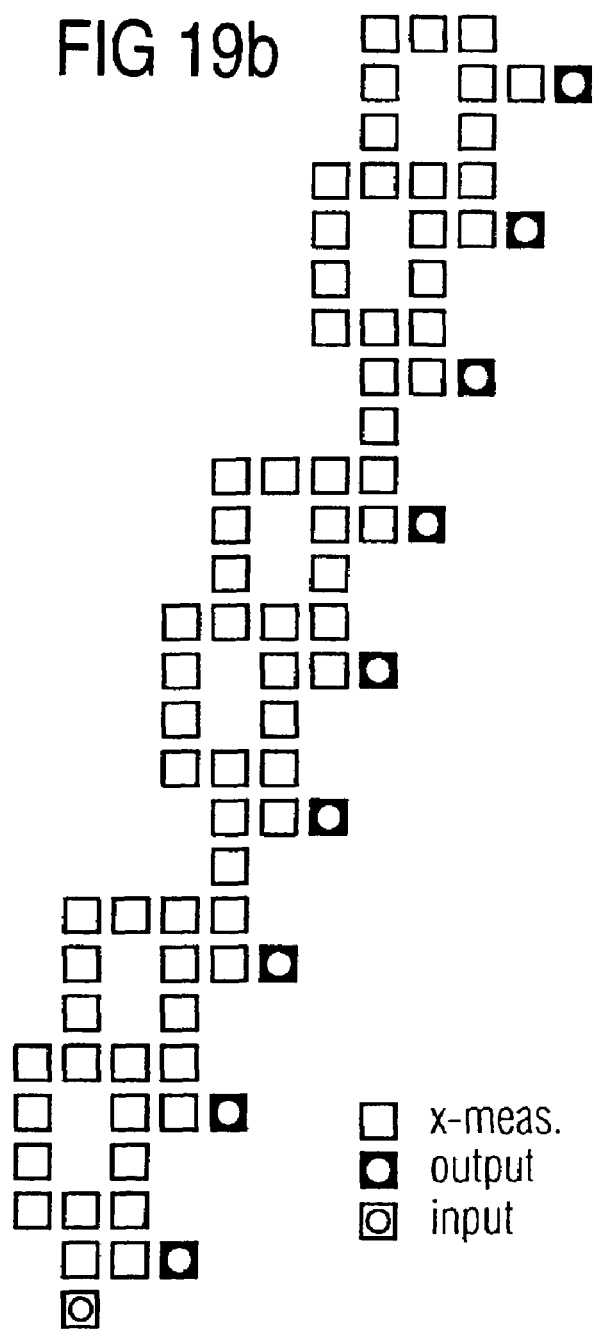

US 7,277,872 B2

METHOD FOR QUANTUM COMPUTING

CROSS-REFERENCE TO RELATED APPLICATION

This application is a continuation of copending International Application No. PCT/EP01/11175, filed Sep. 26, 2001, which designated the United States and which was published in English.

BACKGROUND OF THE INVENTION

Field of the Invention

The present invention relates to a method for quantum computing, in particular to a method of manipulating information in quantum-mechanical systems and transmitting information with quantum-mechanical systems. Furthermore, the invention relates to new applications of particle clusters, in particular of groups of neutral atoms, molecules, ions or other particles.

Quantum computing is a new field of information processing using quantum-mechanical systems. In analogy to classical binary information bits, the quantum-mechanical information unit is a so-called "qubit" which represents the information which can be stored in a 2-state quantum system. Quantum information processing is implemented by unitary operations with the quantum mechanical system as well as with measurement and reading processes. The basic principles of quantum computing and applications of quantum mechanical computers have been described in a number of publications and reviews, e.g. Lloyd, Scientific American, October 1995; DiVincenzo, Science 270, 255, 1995; Ekert and Josza, Rev. Mod. Phys. 68, 733, 1996; H. J. Briegel et al., Phys. Blätter (Phys. Papers), 55, p. 37 (1999) and in textbooks, e.g. The Physics of Quantum Information, Bouwmeester et al. (eds.), Springer 2000; Quantum Computation & Quantum Information, Nielsen and Chuang, Cambridge Univ. Press 2000 which provide a comprehensive introduction into the field. With regard to the definition of basic features of quantum-mechanical computers, in particular with regard to the definition of quantum information, reading and writing information, basic quantum logic gates, multi particle quantum states, quantum logical networks, and quantum communication, these publications are incorporated into the present patent application by reference.

Quantum-mechanical computing is usually based on the implementation of quantum gates with quantum mechanical systems, e.g. atomic systems, quantum dot systems or systems involving Josephson junctions. It has been found, that all mathematical operations can be expressed as a sequence or a logical network of operations of a so-called "CNOT gate" (controlled NOT gate) in combination with unitary operations of qubits. For the implementation of a quantum-mechanical computer, a physical system has to meet in particular the following conditions: (i) identification of single qubits; (ii) capability of addressing and reading the qubits; (iii) implementation of quantum gates; (iv) weak decoherence; (v) efficient implementation of error correction; and (vi) scaling capability.

It is known that NMR-systems (nuclear magnetic resonance systems), quantum-optical systems such as linear ion traps, and other systems can be used for demonstrating basic features of quantum-mechanical computers. However, most of these known systems suffer from a number of disadvantages and restrictions. For example, the NMR-systems are not scalable to a large number of qubits and it has been questioned that they allow the generation of so-called entangled states (Braunstein et al., Phys. Rev. Lett. 83, 1054, 1999) both of which is necessary for the implementation of quantum gates (requirement iii).

A widely discussed system belonging to the quantum-optical systems is based on the generation of ion chains in electro-magnetic traps (Cirac and Zoller, Phys. Rev. Lett. 74, 4091, 1995). These ion chains allow the formation of entangled states and the construction of simple quantum gates. Up to now, entangled states of up to 4 ions have been realized in a controlled manner (Sackett et al., Nature 404, 256, 2000). The linear ion trap quantum computer is regarded as a promising candidate for the realization of a small-scale quantum computer, operating with a few (of the order of 10) ions. It suffers, however, from an unwanted interaction of the ions with the surrounding which diminishes the quantum correlations in the system. There also seem to be serious experimental obstacles to cool a number of ions significantly larger than 10 close to their motional ground state. At present, it is therefore not clear how these systems can be scaled to practically necessary sizes of more than 100 qubits.

A variety of other experimental proposals exist. For a recent review see the Special Focus Issue: Experimental Proposals for Quantum Computation, eds. S. Braunstein and H. K. Lo, Fortschr. Phys. 48, No. 9-11, 2000.

An alternative quantum-optical system that has been proposed recently bases on the arrangement of neutral atoms in far-detuned optical lattices (Jaksch et al., Phys. Rev. Lett. 82, 1975, 1999; Brennen et al., Phys. Rev. Lett. 82, 1060, 1999). An advantage of this system is that the neutral atoms hardly interact with the environment and thus display very small decoherence. Furthermore, with this setup, certain multi-qubit operations can be performed efficiently. In particular, quantum logic gates and efficient schemes for quantum-error correction can be implemented (Briegel et al., J. Mod. Opt. 47, 415, 2000). However, also in this system the requirements for practical realization are extremely demanding. First, the scheme requires a regular filling pattern of the optical lattice which, at present, has not yet been achieved. Second and most important, it requires entanglement operations between arbitrary pairs of selected qubits without affecting all the other qubits in the quantum computer. Such entanglement operations can in principle be implemented, but only with considerable effort. The required procedures are technically involved and subject to decoherence. As in other proposals for quantum computing, a computation includes in this case a sequence of entanglement operations, interrupted by local unitary transformations and possibly measurements. Thus, a large number of these selective entanglement operations must be carried out to perform a quantum computation within this scheme.

SUMMARY OF THE INVENTION

It is accordingly an object of the invention to provide a method of quantum computing with microscopic systems which overcomes the above-mentioned disadvantages of the heretofore-known methods of this general type.

With the foregoing and other objects in view there is provided, in accordance with the invention, a method for quantum computing, the method includes the steps of:

providing a plurality of quantum systems each having at least two different states;

preparing a resource state of the quantum systems wherein all of the quantum systems are in a common superimposed entangled state; and performing an information processing in the resource state by carrying out one-system measurements on the quantum systems.

Another mode of the method according to the invention includes the step of providing the resource state as a cluster state or as a state that can be brought into a form of a cluster state by one-system measurements.

Yet another mode of the method according to the invention includes the step of providing the quantum systems as microscopic particles.

A further mode of the method according to the invention includes the step of providing atomic systems or molecular systems as the microscopic particles.

Another mode of the method according to the invention includes the step of providing a space lattice for accommodating the microscopic particles at given positions.

A further mode of the method according to the invention includes the step of filling the space lattice with the microscopic particles such that the microscopic particles are provided at regularly or irregularly distributed positions in the space lattice.

Yet another mode of the method according to the invention includes the step of creating the resource state by preparing all of the quantum systems in a state |+> and performing a conditional phase gate S obeying $S^{c \leftrightarrow n}(\pi) = |0>_c <0|_c \otimes \sigma_z^{(n)} + |1>_c <1|_c \otimes 1^{(n)}$ between all pairs of next-neighboring ones of the microscopic particles, where c indicates a central qubit and n indicates a neighboring qubit.

Another mode of the method according to the invention includes the step of providing the microscopic particles as extremely cooled neutral atoms in a standing wave laser field forming a lattice.

Yet another mode of the method according to the invention includes the step of generating a two-dimensional laser field or a three-dimensional laser field.

Another mode of the method according to the invention includes the step of cooling the atoms by using a standing wave laser field having a wavelength that is a multiple of a wavelength of the standing wave laser field forming the lattice.

An additional mode of the method according to the invention includes the step of generating the resource state simultaneously for all of the microscopic particles.

Another mode of the method according to the invention includes the step of performing the information processing at least partially by imprinting a quantum logic network on the resource state.

According to a further mode of the invention the step of imprinting the quantum logic network on the resource state includes measuring those of the quantum systems that are present in the resource state but not required for the quantum logic network in a $\sigma_z$-basis; and measuring those of the quantum systems that are needed for the quantum logic network in an appropriate order and in an appropriate basis.

According to a further mode of the invention the step of performing the information processing includes measuring a first group of the quantum systems thereby writing input information into an entangled state of remaining ones of the quantum systems.

Another mode of the method according to the invention includes the step of setting a first group of the quantum systems into a given quantum-mechanical state representing an input information prior to performing the step of preparing the resource state.

According to a further mode of the invention the step of performing an information processing includes initializing a quantum circuit by measuring all those of the quantum systems for which Pauli spin operators $\sigma_x$, $\sigma_y$ and $\sigma_z$ are to be measured; grouping yet unmeasured ones of the quantum systems into sets $Q_i$ and grouping measurements yet to be performed on the quantum systems in $Q_i$ into corresponding sets of measurements $M_i$ each being formed of measurements that can be performed simultaneously; and simultaneously performing the measurements in one set $M_i$, wherein a type of measurement is determined by measurement results of measurements belonging to earlier sets $M_j$.

Another mode of the method according to the invention includes the step of iterating the steps of preparing a resource state. and performing an information processing in the resource state for a plurality of cycles such that during each of the cycles a respective group of the quantum systems remains unmeasured and a quantum mechanical state of the respective group of the quantum systems represents an input information for a next one of the cycles.

The present invention provides a new method for quantum computing that is based on the following ideas. The inventors have demonstrated that an entangled resource state, including in particular a class of highly entangled multi-particle states, the so-called "cluster states" (Briegel and Raussendorf, Phys. Rev. Lett. 86, 910 2001), can serve as a quantum computer. Such resource states can e.g. be implemented with ultra-cold atoms in optical lattices or similar systems. It is shown how a universal set of quantum gates, the CNOT gate and arbitrary one-system rotations, can be implemented by performing one-system measurements only. These one-system measurements are, as compared to the entanglement operations between selected systems, easy to implement. A single quantum system as used in this patent application is a system that has two or more internal states and that can not be subdivided into smaller quantum systems capable of simultaneously carrying information useful for the information processing. Further, it is shown that these gates can be combined to form quantum logic networks. Entangled resource states form the "substrate" for a quantum logic network. The network is imprinted on the quantum state by one-system measurements. The entangled resource state is used up by the computation since the measurements destroy it. The entangled resource states thus form a resource for quantum computation. The picture that emerges is that an entangled resource state can be viewed as a one-way quantum computer, and the set of performed measurements being the program. The present invention is different from a quantum computer realized as a quantum logic network, because first, physical interactions between the quantum system, henceforward referred to as qubits, occur only in the primary step of creating the resource quantum state and computation then is performed via local operations (measurements) only. In contrast, a quantum logic network requires a series of selective interactions among specific pairs of qubits throughout the computation. Second, the logical depth is for many algorithms smaller than in quantum logic networks.

The advantage of the first point is that the creation is simple since it requires only a homogeneous non-selective interaction, for example the Ising interaction. The resource quantum state can be created in a time that is constant in the number of qubits and which thus provides one with a scalable system for quantum computation. Further, the one-qubit measurements of which the genuine part of the computation are formed are—in most systems suitable for quantum computing—much easier to perform than selective two-qubit gates in the network picture. The advantage of the second point is that it reduces the time during which qubits are exposed to decoherence and also the total computation time.

Other features which are considered as characteristic for the invention are set forth in the appended claims.

Although the invention is illustrated and described herein as embodied in a method for quantum computing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 9a to 9c are schematic diagrams which show examples of a CNOT and a T-piece;

FIG. 10 is a schematic diagram which shows how a qubit is transferred from a site of an even sublattice to a site of an odd sublattice;

FIGS. 11a and 11b are schematic diagrams which show a bridge for wires;

FIGS. 19a and 19b are schematic diagrams which show examples for encoding a qubit into 5 or 9 qubits.

DESCRIPTION OF THE PREFERRED EMBODIMENTS

In the following, the basic principles of the invention are outlined in an introduction, followed by a discussion of the implementation of quantum logic networks on cluster states and a discussion of the construction of quantum logic networks in practice.

In this patent application a new scheme for quantum computing is proposed based on one-qubit measurements on a pre-entangled resource state, such as the so-called "cluster states" introduced by Briegel and Raussendorf (Phys. Rev. Lett. 86, 910, 2001; E-print quant-ph/0004051 at <xxx.lan1.gov>).

The scheme is different from quantum logic networks, but each quantum logic network can be implemented on a cluster state.

Figure 1:
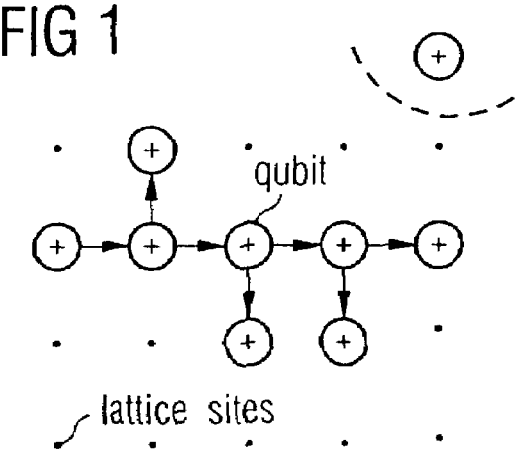
FIG. 1 is a schematic diagram which shows an example for the creation of a cluster state.

Referring now to the figures of the drawings in detail and first, particularly, to FIG. 1 thereof, there is shown an example for a cluster state. The qubits ⊕ are randomly spread over the lattice. Empty sites are marked by a dot. Qubits which can be connected via a series of next-neighboring qubits belong to the same cluster. For example, the qubit in the right upper corner does not belong to the cluster formed by the other shown qubits. As explained in more detail below, cluster state can be produced by initially preparing all qubits in the state |+> and acting upon each pair of neighboring qubits by a conditional phase gate.

The advantage of quantum computing with a resource state in comparison with a quantum logic network is that, during the course of the information processing, only simple one-qubit measurements are needed and no further entanglement needs to be created for performing quantum logic gates. All the entanglement that is needed in the course of a quantum computation is provided by the initial resource state. In quantum logic networks the situation is different; here, entanglement is created during the course of the computation by the use of quantum logic gates. But the gates will typically be much harder to implement than 1-qubit measurements.

The cluster states form, in a sense, the substrate for arbitrary quantum logic networks. The circuit representing the logic network is imprinted on the cluster state by performing one-qubit measurements on a subset of the entangled qubits in the appropriate bases.

The invention is particularly suited for implementation in optical lattices storing ultra-cold atoms (see Jaksch et al., Phys. Rev. Lett. 82, 1975, 1999) and similar systems. An essential advantage of the invention is given by the fact that the cluster states which form the substrate for the quantum computer can be made very large. Thus, in this proposal for quantum computing one is provided with a scalable system. A cluster state can serve for a computational task bounded in its complexity by the size of the cluster, but otherwise freely choosable. Furthermore, the present invention supports the view of regarding entanglement as a resource for quantum computing. This is because the quantum state is destroyed in the process of imprinting the quantum logic network on it and can therefore not be used a second time.

Figure 2:
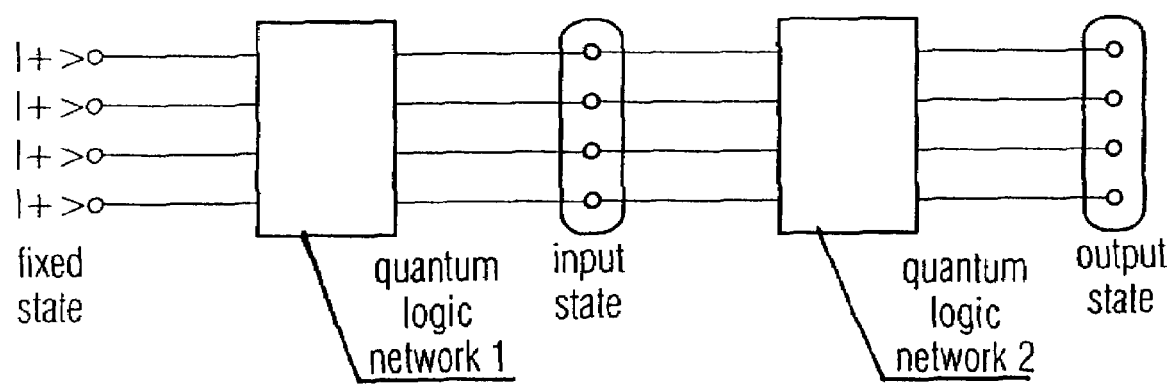
FIG. 2 is a schematic diagram which shows a scheme for the creation of a desired input state for a basic quantum logic network.

In the following the principle of realization of a quantum logic network on a cluster state is outlined. FIG. 2 shows the schematics of a quantum logic network. As will be outlined in more detail below, quantum logic networks usually involve the creation of the desired input state out of a fixed state by quantum logic network 1 and performing the computation with that input state by a quantum logic network 2.

Furthermore, the construction of quantum logic networks on cluster states is discussed in detail. It is displayed how the CNOT gate and arbitrary one-qubit rotations can be implemented on a cluster state. These gates form a universal set, i.e. every quantum logic gate can be constructed out of these elementary parts. That the elementary gates can in the proposed implementation on cluster states be combined to form a quantum logic network is also shown. Furthermore, it is discussed how to eliminate qubits that are in the cluster state but are not required for the quantum logic network. It is also shown that the gates are to an extent allowed to vary in shape. Thus, a hole in the cluster, i.e. an unoccupied qubit site, does not matter since its role can be taken over by a neighboring qubit.

At that point, the practically occurring case, a quantum logic network on a cluster state with irregular arrangement of qubits is reduced to the case where only the qubits necessary for the gate are present and arranged in some canonical order.

At that point, one is ready to prove the two essential points: the gates can be combined to form a quantum logic network and, the randomness of the results of measurements necessary to imprint the network on the cluster state can be accounted for.

Furthermore, some additional material of the proposed implementation is presented, for example, a "crossing of wires" in two dimensions. An implementation of a conditional phase gate with capability of freely adjusting the rotation angle is displayed. Further, an extension of the scheme for quantum computation on cluster states discussed so far is given. It picks up the question that is important for the practical implementation: "I can create big cluster states, but the computations I want to perform are also quite extensive. It turns out that my cluster states are just not big enough to serve the purpose. How can I get round this?" There is an answer to that question which will be given later on.

The remainder of the introduction is devoted to a review on cluster states and their entanglement properties and further to experimental techniques needed to create and manipulate cluster states. A practical implementation of the invention bases on experimental techniques which are known as such in quantum optics, in particular in the field of trapping and cooling of neutral atoms in magnetic traps and optical lattices. Details of these techniques are available in the literature.

Cluster states can be created by randomly filling a lattice of sites $$i = \sum_{l=1}^{d} n_l i_l,$$

with $n_l$ denoting any natural number, d the dimension of the lattice and $i_l$ the lattice vectors, with particles representing qubits. Each site carries either one or none qubit. All qubits are initially prepared in the state $|+\rangle = (|0\rangle + |1\rangle)/\text{sqrt}(2)$. Then between all pairs of next-neighboring qubits a conditional phase gate is performed. Let the left or the lower (or the fore in d=3) qubit be qubit c (central) and the other be qubit n (neighbor). Then the conditional phase gate performed with these two qubits is:

$$S_{c \to n}(\pi) = |0\rangle_c \langle 0|_c \otimes \sigma_z^{(n)} + |1\rangle_c \langle 1|_c \otimes 1^{(n)} \quad (1)$$

All the gates in each one of the directions are performed simultaneously such that there are only d entanglement operations no matter what the number of qubits is. The temporal order of the gates is of no concern for the produced state since the conditional phase gates all commute. Qubits that can be connected by a path of occupied next neighboring sites belong to the same cluster; in turn those qubits which cannot be connected that way belong to different clusters. The quantum state of the qubits on a lattice is a product state of cluster states. For precise definition of cluster states see (Briegel and Raussendorf, Phys. Rev. Lett. 86, 910, 2001; E-print quant-ph/0004051 at <xxx.lan1.gov>).

Cluster states $|\Phi\rangle_c$ can be described by the following set of eigenvalue equations:

$$\sigma_x^{(a)} \prod_{i \in nbrs(a)} \sigma_z^{(i)} |\Phi\rangle_c = \pm |\Phi\rangle_c \quad (2)$$

Where a is an arbitrary occupied lattice site and nbrs(a) is, for example, the set of all occupied next-neighboring sites of a. The eigenvalue tl is determined by which next-neighboring sites of a are occupied. The quantum correlations of the cluster state $|\Phi\rangle_c$ that follow from (2) have been essential for proving that quantum gates can be realized in this proposal of a quantum computer.

For practical realization of the proposed invention, using e.g. atoms trapped in optical lattices, 4 major requirements must be fulfilled.

(i) The atoms trapped in the lattice must be cooled to their motional ground state. This has been achieved to a very good approximation (see Hamann et al., Phys. Rev. Lett. 80, 4149, 1998; Kerman et al., Phys. Rev. Lett. 81, 439, 2000).

(ii) The optical lattice must be filled with high filling factor (probability for a lattice site to be occupied by a single atom), but can be filled irregularly. This has been achieved (see DePue et al., Phys. Rev. Lett. 82, 2262, 1999).

(iii) A controlled simultaneous interaction between the atoms, which results in a conditional phase gate between all pairs of neighboring qubits, must be implemented. With the experience of state of the art atom interferometry this is feasible (see Jaksch et al., Phys. Rev. Lett. 82, 1975, 1999; Briegel et al., J. Mod. Opt. 47, 415, 2000).

(iv) The atoms have to be addressed individually to permit selective one-qubit measurements. To accomplish this, the scheme of cooling the atoms and then performing a controlled interaction between them must be extended (see Scheunemann et al., Phys. Rev. A 62, 051801(R), 2000; Weitz, IEEE J. Quant. Electronics 36, 1346, 2000).

With regard to item (iii) it is noted that the atoms are cooled and trapped by an electromagnetic field, supplied by two counterpropagating linearly polarized laser beams for each spatial direction. (The following is described in detail in Jaksch et al., Phys. Rev. Lett. 82, 1975, 1999; Briegel et al., J. Mod. Opt. 47, 415, 2000). For each of the spatial directions, the polarization directions of the two respective laser beams differ by an angle which can be controlled (lin-angle-lin configuration). If now the laser frequency is adjusted to a particular value the individual atoms are subject to a state dependent potential.

For both internal states of the atoms, |0> and |1>, the electric potential remains sinusoidal, but with the minima translated. The relative translation distance is controlled by the angle between the polarization directions of the laser beams. If this angle is varied adiabatically such that the atoms can follow the moving potential without being excited, the atoms on the lattice can be translated depending upon the state which they are in. If the relative translation between the two potentials seen by the atoms is equal to the distance between neighboring atoms, these neighboring atoms can be made to interact via s-wave scattering.

By this interaction a quantum gate between neighboring atoms is realized. After the interaction the atoms are brought back to their initial positions by turning the angle between the two polarization directions back to zero. It is important to notice that the interaction in this scheme is performed simultaneously between all pairs of neighboring atoms. If the atoms in the lattice are prepared in the quantum mechanical superposition |+>=(|0>+|1>)/sqrt(2) and the interaction time is adjusted properly then the emerging quantum state is the required cluster state. The initial superposition |+> for the internal state of each atom is achieved by applying a laser pulse of appropriate intensity and duration ($\pi/2$-pulse) on the whole sample of atoms.

The frequency of the counterpropagating lasers which constitute the trapping potential determines the distance between neighboring atoms. The drawback of the scheme is that to make the potential seen by the atoms state dependent, the frequency of the lasers must be high (e.g. at an optical frequency which is between the S1/2-P1/2 and S1/2-P3/2 transition line for Rb atoms) and, correspondingly, the distance between neighboring atoms on the lattice is very small. Therefore, individual atoms cannot be resolved by standard spectroscopic methods. In this scheme, measurements on individual qubits are not straightforwardly possible.

Accordingly, it is preferred that the lattices for cooling the atoms and for performing the interaction between neighboring atoms are different. As described in detail in Scheunemann et al., Phys. Rev. A 62, 051801(R), 2000; Weitz, IEEE J. Quant. Electronics 36, 1346, 2000, the wavelength of the infrared laser used for cooling and-initial trapping is a multiple of the wavelength of the laser used to accomplish the interaction. In the first step, the atoms are cooled and trapped by in an optical lattice created by the infrared lasers (Friebel et al., Phys. Rev. A 57, R20, 1998). In a second step, after cooling, the infrared lattice is switched off and the short wavelength lattice is switched on. Since the lattice constant of the former lattice is a multiple of the lattice constant of the latter, potential minima can be arranged to coincide. Thus, the atoms are adiabatically transferred without being excited. Now, the interaction is performed as before. The only difference is that the atoms have to be carried over a larger distance since the short wavelength lattice is now populated only on a sublattice. Now, the atoms are separated far enough from each other to permit individual addressing. One-qubit measurents are for example performed by means of conditional resonance fluorescence techniques, also referred to as quantum jump method (Cirac and Zoller, Phys. Rev. Lett. 74, 4091, 1995), which can be performed with near 100% detection efficiency (Nagourney et, al., Phys. Rev. Lett. 56, 2787, 1986; Sauter et al., Phys. Rev. Lett. 57, 1696, 1986; Bergquist et al., Phys. Rev. Lett. 57, 1699, 1986). This extended scheme is a subject of current experiments (see Weitz, "Towards controlling larger quantum systems: From laser cooling to quantum computing", IEEE J. Quant. Electronics 36, 1346, 2000).

While we have described a particular implementation of the proposed method of quantum computation via one-qubit measurements, namely in optical lattices, there are other systems in which the method could be implemented. This includes arrays of magnetic microtraps on nanofabricated surfaces (Calarco et al., Phys. Rev. A 61 022304, 2000) and arrays of capacitively coupled quantum dots in semiconductor materials (Tanamoto, E-print quant-ph/0009030 at <xxx.lanl.gov>), for example. Similar ideas can be applied to system of Josephson junctions (J. E. Mooij et al., Science, 285, p. 1036 (1999)).

Figure 3A:
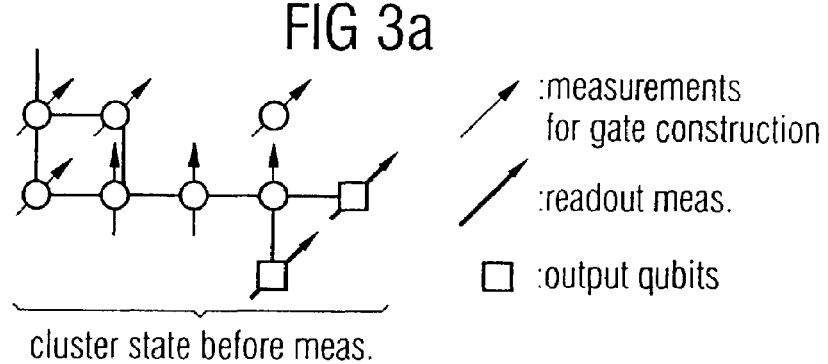
FIGS. 3a and 3b are schematic diagrams which show an example for a realization of a simple quantum computer on a cluster state.
Figure 3B:
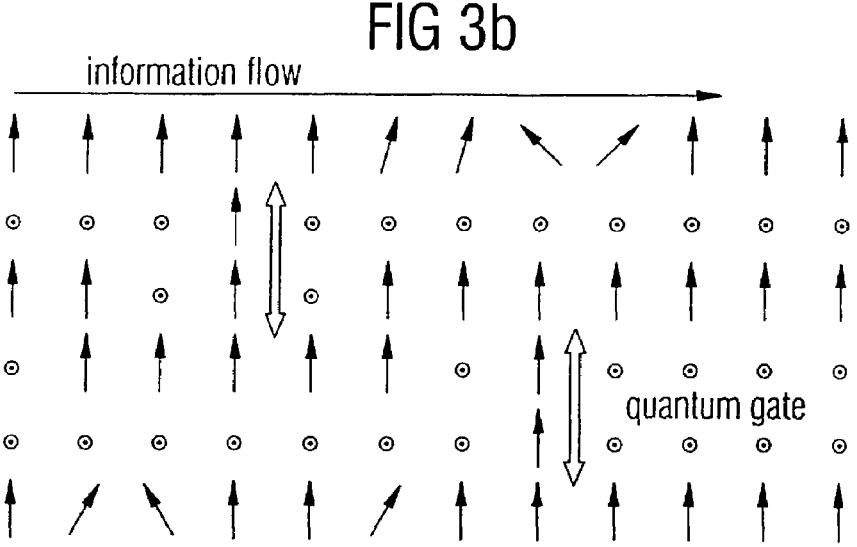

In the following the principles of quantum computing with entangled resource states are explained. FIG. 3a shows an example for a realization of an elementary quantum computer on a cluster state. As will be explained in more detail below, an embodiment of the present invention involves the creation of the desired input state from a fixed state. Thereafter the computation evolves by imprinting the quantum logic network and reading out the results. Those steps are all performed only by one-qubit measurements. FIG. 3b illustrates quantum computing by measuring two-state particles on a lattice. Before the measurements the qubits are in the cluster state as given by equation (2). Circles ⊙ symbolize measurements of $\sigma_z$, vertical arrows are measurements of $\sigma_x$ while tilted arrows refer to measurements in the x-y plane.

Quantum computing with cluster states is a quantum computing scheme conceptually different from quantum logic networks. However, it will be shown that each quantum logic network can be implemented on a cluster state. Every computation that can be done with a quantum logic network can also be performed by the use of a cluster state.

As can be seen from FIG. 2 quantum computing based on a quantum-logic network involves the creation of the input state out of a fixed state, e.g. $|+>^N$ by a quantum logic network 1 and computation with that input state performed by quantum logic network 2. To accomplish this with the help of a cluster state, the following steps have to be performed:

reaction of the cluster state $|\Phi>_c$ measuring all but the output qubits in the appropriate basis (programming the cluster state); and measuring the output qubits (readout).

Figure 4A:
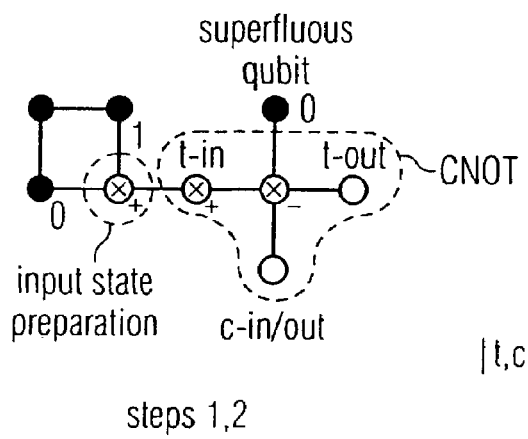
FIGS. 4a and 4b are schematic diagrams which show an example for imprinting a quantum logic gate on a cluster state.
Figure 4B:
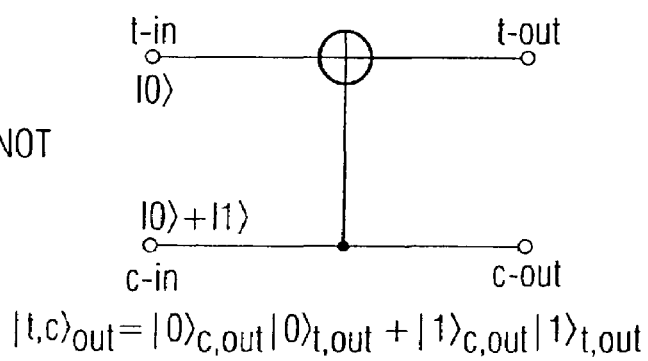

An example of imprinting a quantum logic gate on a cluster states is given in FIGS. 4a and 4b. In FIG. 4a, a cluster of qubits is shown. Thereby, of those qubits characterized by a ●, $\sigma_z$ is measured, of those qubits characterized by a ⓧ, $\sigma_x$ is measured, and those qubits characterized by a ○ are the output qubits. Measurement outcomes (arbitrary choice shown) are designated by {0,1} for $\sigma_z$-measurements and {+,−} for $\sigma_x$-measurements, respectively. In FIG. 4b, the corresponding quantum gate that is thereby realized (CNOT) and the corresponding output state are shown.

There is also a simplified scheme containing only one step. Normally, the input state of the qubits is a product state, i.e. a disentangled pure state. Then, step 1 in the above task-list can be omitted, if instead writing the input is included in the preparation of the initial state. Then, the input qubits are set to their required quantum state and all other qubits on the cluster are set to the individual state |1> as usual. Further, the usual entanglement step, the conditional phase gate between neighboring qubits, is performed.

Now, only the quantum logic network to perform the calculation itself must be implemented by one-qubit measurements on the cluster, while the step imprinting the quantum logic network to set the input state drops out. This makes the implementation of the quantum logic network more compact, but on the other hand the simplified scheme is conceptually less powerful. Now one has to tailor a specific initial state to imprint the quantum logic network on the specific initially prepared state, while in the full scheme one uses a universally applicable resource, the cluster state. On the, other hand, in order to use the described quantum computer for quantum cryptography, unknown quantum states must be processed. This can be done with the described procedure where the group of particles representing the output register is not measured. In this way, an unknown quantum state is read in and processed. The output in this mode of running the quantum computer is a quantum state, carried by the set of quantum systems which form the output register. This output state can then e.g. be stored for later use, or teleported, or otherwise transmitted to any other participant in the cryptographic network. Such a processing is an important ingredient in quantum repeaters needed for long-distance quantum communication (Briegel et al., Phys. Rev. Lett. 81, 5932 (1998)).

In the following, it will be shown how to implement a universal set of quantum gates, the CNOT and arbitrary one-qubit rotations, and how to combine these building blocks to quantum logic networks. Especially, the implementation of the elementary piece of wire, arbitrary one-qubit rotations and the CNOT gate are addressed for the case that no other than the required qubits are present in the quantum state.

Figure 5:
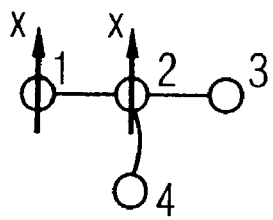
FIG. 5 is a schematic diagram which shows an example for an implementation of a CNOT gate on a cluster state of 4 qubits.

FIG. 5 shows an example for an implementation of a CNOT gate on a cluster state of 4 qubits. In the following, it is shown how a CNOT gate between two qubits, target qubit 1 and control qubit 4, is implemented on a cluster-like state of 4 qubits. The input state consists of qubit 1 (target) and 4 (control). Qubits 1 and 2 are measured in the x-basis to perform the gate. The output state is encoded in qubits 3 (target) and 4 (control). By the action of the gate the result of the computation is transferred to a qubit 3, while the control qubit remains at its site. Specifically, we want to implement the following gate:

$$CNOT(1\to 3,4) = |0\rangle\langle 0|_4 \otimes 1^{(1\to 3)} + |1\rangle\langle 1|_4 \otimes \sigma_x^{1\to 3} \quad (3)$$

where $$\sigma_x^{(1\to 3)} = |0\rangle_3\langle 1|_1 + |1\rangle_3\langle 0|_1$$

To implement the CNOT gate one proceeds as follows. Suppose it has been prepared the 4 qubit state:

$$|\Psi\rangle_{1-4} = |\psi_{14}\rangle_{1,4} \otimes |+\rangle_2 \otimes |+\rangle_3 \quad (4)$$

where the input state has been encoded by $|\Psi_{14}\rangle_{1-4}$ in the qubits 1 and 4. On the state $|\Psi\rangle_{1-4}$ the entanglement operation $S_{1\to 2} \otimes S_{2\to 3} \otimes S_{4\to 2}$ is performed, which concludes the state preparation. If the qubits are arranged in the pattern displayed in FIG. 5 then this is the entanglement operation which is automatically carried out by the simultaneous conditional phase gate. To implement the gate, now measure the qubits 1 and 2 in the x-basis, i.e.

$$\text{qubit 1 in } B_1 = \left\{ \frac{|0\rangle_1 + |1\rangle_1}{\sqrt{2}}, \frac{|0\rangle_1 - |1\rangle_1}{\sqrt{2}} \right\} \quad (5)$$

-continued $$\text{qubit 2 in } B_2 = \left\{ \frac{|0\rangle_2 + |1\rangle_2}{\sqrt{2}}, \frac{|0\rangle_2 - |1\rangle_2}{\sqrt{2}} \right\}$$

The output state then is $$|\mu\rangle_{1-4} = |s_1\rangle_1 \otimes |s_2\rangle_2 \otimes |\psi_{34}\rangle_{3,4}, \text{ with}$$
$$|\psi_{34}\rangle = CNOT'|\psi_{14}\rangle \quad (6)$$

where $$CNOT' = \sigma_z^{(3)^{s_1+1}} \sigma_x^{(3)^{s_2}} \sigma_z^{(4)^{s_1}} CNOT(1\to 3,4) \quad (7)$$

The quantum computation is completed by the readout, i.e. one-qubit measurements on the output qubits. For an isolated gate, whose cluster state implementation to explain was the aim of this subsection, the extra rotations $\sigma_x$ and 94 $_z$ in equation (7) that are carried out in addition to the desired CNOT-gate can be compensated. Which extra rotations occurred is known from the measurement results $s_1$ and $s_2$. To compensate for them, one applies the inverse rotations on the output before the measurements are performed. One can equivalently omit the counter-rotations, but then has to change readout measurement directions or interpretation of readout measurement outcomes, respectively. How the unwanted extra rotations can be accounted for if the gate is part of a quantum logic network will be explained later on.

An arbitrary one-qubit rotation U in SU(2) can be performed on a chain of five qubits, e.g. between a qubit 1 at site i and a qubit 5 at site $i+4i_1$. Initially, a quantum state $$|\Psi\rangle_{1-5} = |\psi_1\rangle_1 \otimes |+\rangle_2 \otimes |+\rangle_3 \otimes |+\rangle_4 \otimes |+\rangle_5 \quad (8)$$

is prepared and acted upon by the simultaneous entanglement operation $S_{1\to 2} \otimes S_{2\to 3} \otimes S_{3\to 4} \otimes S_{4\to 5}$. Let us assume for a moment that then qubits 1 to 4 are measured in the following bases $$\text{qubit 1 in } B_1 = \left\{ \frac{|0\rangle_1 + |1\rangle_1}{\sqrt{2}}, \frac{|0\rangle_1 - |1\rangle_1}{\sqrt{2}} \right\} \quad (9)$$

$$\text{qubit 2 in } B_2(\alpha) = \left\{ \frac{|0\rangle_2 + e^{i\alpha}|1\rangle_2}{\sqrt{2}}, \frac{|0\rangle_2 - e^{i\alpha}|1\rangle_2}{\sqrt{2}} \right\}$$

$$\text{qubit 3 in } B_3(\beta) = \left\{ \frac{|0\rangle_3 + e^{i\beta}|1\rangle_3}{\sqrt{2}}, \frac{|0\rangle_3 - e^{i\beta}|1\rangle_3}{\sqrt{2}} \right\}$$

$$\text{qubit 4 in } B_4(\gamma) = \left\{ \frac{|0\rangle_4 + e^{i\gamma}|1\rangle_4}{\sqrt{2}}, \frac{|0\rangle_4 - e^{i\gamma}|1\rangle_4}{\sqrt{2}} \right\}$$

where the respective qubits j, j=1 . . . 4, are projected into the former (latter) eigenstate of the measurement basis Bj if the measurement result $s_j$ is 0 (1). The state $|\mu\rangle_{1-5}$ which by that emerges is $$|\mu\rangle_{1-5} = |s_1\rangle_1 \otimes |s_2\rangle_{2,\alpha} \otimes |s_3\rangle_{3,\beta} \otimes |s_4\rangle_{4,\gamma} \otimes |\psi_5\rangle_5$$
$$\text{with } |\psi_5\rangle = U|\psi_1\rangle \quad (10)$$

Therein U is given by $$U(\alpha,\beta,\gamma) = \sigma_x^{s_2+s_4} \sigma_z^{s_1+s_3} U_x((-1)^{s_1+s_3}\gamma) U_z((-1)^{s_2}\beta) U_x((-1)^{1+s_1}\alpha) \quad (11)$$

where $U_x(\alpha)$ is a rotation about the x axis about the angle $\alpha$ etc. In the standard basis $\{|0\rangle, |1\rangle\}$ the rotations $U_x$ and $U_z$ read in matrix form $$(U_x(\alpha)) = \begin{pmatrix} \cos\frac{\alpha}{2} & -i\sin\frac{\alpha}{2} \\ -i\sin\frac{\alpha}{2} & \cos\frac{\alpha}{2} \end{pmatrix}, (U_z(\beta)) = \begin{pmatrix} e^{-i\frac{\beta}{2}} & \\ & e^{i\frac{\beta}{2}} \end{pmatrix} \quad (12)$$

From equation (11) we see that procedure (9) yields a unitary operation composed of a sequence of rotations. The rotation angles of each of the first three rotations is determined by the measurement direction of one of the qubits and the outcomes of the measurements of some other qubits (sign of the rotation angle). In particular we note that whether the first rotation ($U_x$) is about the angle $\alpha$ or $-\alpha$ is determined by the result $s_1$ of the measurement of qubit 1. The angle $\alpha$ itself is adjusted by choosing the basis $B_2(\alpha)$ for measurement of qubit 2. In the same manner, whether the second rotation ($U_z$) is about $\beta$ or $-\beta$ is determined by the measurement result at qubit 2, while the angle $\beta$ itself is adjusted by choosing the measurement basis $B_3(\beta)$ of qubit 3. Whether the third rotation ($U_x$) is about the angle $\gamma$ or $-\gamma$ is determined by the measurement results at qubits 1 and 3 while the angle $\gamma$ itself is adjusted by choosing the measurement basis $B_4(\gamma)$ at qubit 4. From this observation it follows that in order to perform a rotation one has to perform the measurements at the qubits 1-4 in the order 1, 2, 3, 4.

Measurement bases have to be chosen according to previously obtained measurement results. The sequence of three rotations about angles $\pm\alpha$, $\pm\beta$ and $\pm\gamma$ is followed by possible special rotations $\sigma_x$ and $\sigma_z$ depending on the outcomes of the measurements at qubits 1 to 4, $s_1, \ldots, s_4$. As will be shown, these additional rotations can be accounted for at the end of the computation. Note that the sequence of the first 3 rotations very much resembles the representation of an arbitrary rotation in terms of Euler angles.

We want to perform the rotation $$U_R(\xi,\eta,\zeta)=U_x(\zeta)U_z(\eta)U_x(\xi) \quad (13)$$

on a qubit where $\xi$, $\eta$ and $\zeta$ are the Euler angles. To do that we perform the following steps (procedure 14):

(i) Measure qubit 1 in the basis $B_1$.
(ii) Depending on the measurement result at qubit 1, $s_1=0$ or $s_1=1$, measure qubit 2 in the basis $B_2(-\xi)$ or $B_2(\xi)$.
(iii) Depending on the measurement result at qubit 2, $s_2=0$ or $s_2=1$, measure qubit 3 in the basis $B_3(\eta)$ or $B_3(-\eta)$.
(iv) Depending on the measurement result at qubit 1 and 3, $s_1+s_3$ mod2=0 or $s_1+s_3$ mod2=1, measure qubit 4 in the basis $B_4(\xi)$ or $B4(-\xi)$ By this procedure (14), the rotation $U'_R$ is achieved $$U'_R = \underbrace{\sigma_x^{s_2+s_4}\sigma_z^{s_1+s_3}}_{\text{can be accounted for}} U_R \quad (15)$$

As already stated, in the following it will be explained how the possible $\sigma_x$- and $\sigma_z$-rotations can be corrected at the end of the computation.

At this point we emphasize, that this procedure as it stands is only valid for an isolated one-qubit rotation. If the rotation becomes part of a quantum logic network the procedure will slightly change. This issue is discussed later on.

The elementary piece of wire takes the state $|\psi_1\rangle$ of a qubit two qubits further. It is important to note here that the standard piece of wire is not between neighboring qubits. Consider a chain of 3 qubits, where qubit 1 had been prepared in $|\psi_1\rangle$, qubits 2,3 in $|+\rangle$ and where qubits 1 and 2 have been measured in $\nu_x$, after the entanglement operation. With similar definitions as before:

$$|\psi_3\rangle = U_{wire}|\psi_1\rangle \quad (16)$$

where we want $$U_{wire}=1 \quad (17)$$

By measuring qubits 1 and 2 in $\sigma_x$ we obtain the following unitary operation $U_{wire}$, instead of $U_{wire}$:

$$U'_{wire}=\nu_x^{1+s_2}\sigma_z^{1+s_1}1 \quad (18)$$

and again, the possibly occurring rotations $\sigma_x$ and $\sigma_z$ can be corrected at the end of the computation.

It will occur very often that there are qubits in the cluster state which are not needed for the quantum logic network one wants to implement. Those qubits are measured in the $\sigma_z$-basis. After that, the superfluous qubits have only minor influence on the quantum logic network and this influence can be corrected; what needs to be done is to change the interpretation of measurement results on the essential qubits.

To see this we define the following sets of qubit sites $\mathcal{E}$ set of sites of qubits essential for the quantum logic network.

$\mathcal{S}_0$ set of sites of superfluous qubits which are projected into $|0\rangle$ by the $\sigma_z$-measurement.

$\quad (19)$ $\mathcal{S}_1$ set of sites of superfluous qubits which are projected into $|1\rangle$ by the $\sigma_z$-measurement.

$\mathcal{RR} \subset \mathcal{E}$ Set of sites of essential qubits which are affected by the superfluous qubits at sites in $\mathcal{S}_0 \cup \mathcal{S}_1$ Further, we introduce the two functions ubrs(a) (upper neighbors) and lbrs(a) (lower neighbors).

ubrs(a) Set of all those next neighboring sites $$\vec{j} = \sum_{l=1}^{d} j_l \vec{e}_l \text{ of site } \vec{a}, \text{ for which } \sum_{l=1}^{d} j_l = \left(\sum_{l=1}^{d} a_l\right) + 1$$

lbrs(a) Set of all those next neighboring sites $\quad (20)$ $$\vec{j} = \sum_{l=1}^{d} j_l \vec{e}_l \text{ of site } \vec{a}, \text{ for which } \sum_{l=1}^{d} j_l = \left(\sum_{l=1}^{d} a_l\right) - 1$$

With the definitions (20) one has ubrs(a)∪lbrs(a)=nbrs(a); for all a. Now be $|\Phi\rangle_E$ a cluster state of only essential qubits and $|\Psi\rangle_E$ a state obtained from a cluster state $|\Phi\rangle_C$, $C=E\cup S_0\cup S_1$ where the superfluous qubits have been measured in $\sigma_z$. Then, the two states $|\Phi\rangle_E$ and $|\Psi\rangle_E$ can be transformed into another by a local unitary transformation, $$|\Psi\rangle_\varepsilon = \left(\prod_{i \in S_0} \prod_{j \in ubrs(i)} \sigma_z^{(j)}\right)\left(\prod_{i' \in S_1} \prod_{j' \in lbrs(i')} \sigma_z^{(j')}\right)|\Phi\rangle_\varepsilon \quad (21)$$

The affected essential qubits have their site in the set R, i.e. R consists of all those qubit sites on whose qubits in equation (21) an odd number ($\sigma_z^2=1$) of rotations $\sigma_z$ is applied.

$$|\Psi\rangle_\varepsilon = \prod_{i \in R} \sigma_z^{(i)} |\Psi\rangle_\varepsilon \qquad (22)$$

In all the discussed cases measurements of essential qubits have their measurement axis in the x/y-plane, i.e. $\sigma_x \cos\phi + \sigma_y \sin\phi$ is measured. To see the effect on the interpretation of measurement outcomes we compare the states $|\Phi\rangle_E$ and $|\Psi\rangle_E$, but with a further qubit at site k, k in R, measured. Be $$P_\pm^{(k)} = \frac{1 \pm (\cos\varphi\sigma_x + \sin\varphi\sigma_y)}{2} \qquad (23)$$

the projector that describes the action of the measurement at -qubit site k on the states $|\Phi\rangle_E$ and $|\Psi\rangle_E$. Then, by equations 22 and 23, one finds $$P_\pm^{(k)} |\Psi\rangle_\varepsilon = \prod_{i \in R} \sigma_z^{(i)} P_\mp^{(k)} |\Phi\rangle_\varepsilon \qquad (24)$$

Thus, the meanings of results of measurements on a state $|\Psi\rangle_E$ at qubits with their sites in R are interchanged in comparison with the meanings of these measurement results for $|\Phi\rangle_E$.

To eliminate the effect of qubits which are present in the cluster but not necessary to implement the quantum logic network, it is preferred to
(i) measure the superfluous qubits in $\sigma_z$. Determine the sets $S_0$, $S_1$ and from them the set R.
(ii) measure the essential qubits in the usual manner. For qubits at sites k in R keep the inverse $\neg s_k$ of the measurement result $s_k$, $\neg s_k = 1 - s_k$. For qubits at sites k' in E\R keep the measurement result $s_{k'}$.
(iii) on the basis of the (modified) measurement results $s_k$ ($\neg s_k$) compute the counter-transformation to act upon the output state along the same lines as if there were no superfluous qubits present and no measurement results inverted. Perform readout measurements in the usual manner.

Figure 6:
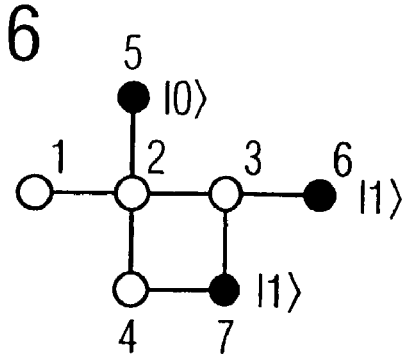
FIG. 6 is a schematic diagram which shows another example for an implementation of a CNOT gate on a cluster state.

FIG. 6 shows an example for an implementation of a CNOT gate on a cluster state illustrating this procedure. To implement a CNOT between qubits 1 and 4, first the superfluous qubits 5, 6, 7 are eliminated by measuring them in $\sigma_z$. In this example E={1, 2, 3, 4}, $S_0$={5}, $S_1$={6, 7}, R={3, 4}. The state of qubits that emerges after the $\sigma_z$-measurements is local unitary equivalent to the state obtained after initial state preparation if the qubits 5, 6, 7 were not present. The local unitary transformation by which the two states can be transformed into each other is $\sigma_z^{(3)}\sigma_z^{(4)}$. Therefore, if qubits 3 and 4 are measured in $\sigma_x$, $\sigma_y$ measurement results $s_{3/4}=0$ (1) are equivalent to $s_{3/4}=1(0)$ in the standard case (qubits 5, 6, 7 not present).

The shape of the gates and of wire is variable. Gates and wire can be rotated and bent, but there is one rule to respect: qubits which were not next neighbors in the standard implementation of the quantum logic network cannot become next neighbors in the implementation with bent gates and wire.

The variability of the shape of gates and wire is important since one has in general no control of the filling pattern of the qubit lattice. Qubit clusters that one is thus confined to work with may have "holes" at lattice sites where one wants to imprint a wire, and one therefore must be allowed to lay a bypass. The system is flexible enough to permit this compensation for the irregularity of the lattice filling, pattern.

The reason for this robustness is the following equation obeyed for the conditional phase gate defined in equation (1) which is simultaneously carried out between all pairs of neighboring qubits to produce the entangled initial state.

$$S_{c \to n}(\pi) = \sigma_z^{(c)} \sigma_z^{(n)} S_{n \to c}(\pi) \qquad (25)$$

If the shape of a gate is varied all that occurs are interchanges of the role of control and target qubits for some of the simultaneously performed conditional phase gates in the course of the resource creation. But this produces, in comparison to the output state of standard implementation, in accordance with equation (25) only extra rotations $\sigma_z$, on some qubits. Thus, the situation encountered here is the same as before where the influence of superfluous qubits was discussed. Let $|\Phi\rangle$ be the cluster state only of essential qubits and them being in some standard arrangement; and $|\Psi\rangle$ the cluster state of the same number of qubits, but in different arrangement due to variation of the shape of some gates. Then the following equation holds $$|\Psi\rangle = \prod_{k \in R_{vs}} \sigma_z^{(k)} |\Phi\rangle \qquad (26)$$

where the set $R_{vs}$ is determined by use of equation (25). Therefore, before interpretation measurement results on qubits at sites k in $R_{vs}$ must be inverted. To reduce a quantum computation on a cluster state with qubits in different arrangement as compared to some standard implementation proceed as follows:
(i) Measure the qubits implementing the quantum logic network in the appropriate bases and in the usual order.
(ii) From the shape of the cluster and by use of equation (25), determine the set $R_{vs}$ of qubits sites upon whose qubits acted, beyond the simultaneous conditional phase gate, an extra rotation $\sigma_z$ in comparison to the standard qubit arrangement.
(iii) Invert all measurement outcomes $s_k$ for qubit sites k in $R_{vs}$. Then proceed as usual.

Figure 7:
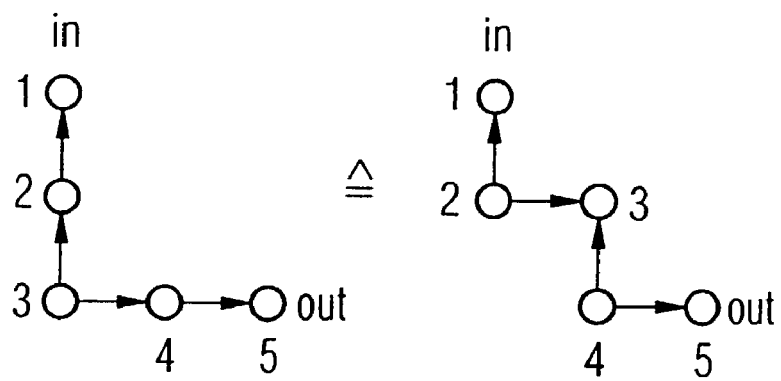
FIG. 7 is a schematic diagram which shows examples for the implementation of a wire.

As an example, the reinterpretation of measurement results on a 5-qubit piece of wire in snake-like shape as compared to the same piece of wire in some standard (angle) arrangement is displayed in FIG. 7.

As illustrated in FIG. 7, the 5 qubits of this piece of wire are in the same order in both cases, but the shape of the right wire is varied as compared to the left one (in standard arrangement). Accordingly, for the initially applied conditional phase gates between qubits 2 and 3, and 4 and 3 respectively, control and target qubit are interchanged. After state preparation, the transformation that takes the 5-qubit state displayed at the right to the state displayed at the left is $\sigma_z^{(2)}\sigma_z^{(4)}$. As a consequence, when measuring $\sigma_x$ of qubits 1 to 4 to implement a piece of wire, measurement results at sites 2 and 4 have to be inverted before being interpreted with rules for standard arrangement of qubits.

In the following the so-called "connectivity property" is discussed. What we termed "connectivity property" is the fact that the action of a quantum logic network can be understood from its elementary components. I.e. a quantum gate with "quantum" wires (by "quantum" wire we mean in this context a wire for qubit quantum states, not a carbon nano-tube or similar device for which the term is usually reserved) attached to its legs should have no other effect than the gate itself, and two pieces of "quantum" wires put together should act like one "quantum" wire. In general, we want to combine the elementary gates to quantum logic networks in the same manner as we combine classical gates and wire to classical logic networks.

To keep the notation transparent, for the moment we will confine ourselves to the proof in a very special case, the combination of two elementary pieces of wire to a wire that takes a qubit four lattice sites further. But this very special case already covers the essence of the argument.

The standard procedure to implement wire between qubits 1 and 5 is 1) prepare the state $|\psi_1\rangle_1 \otimes |+\rangle_2 \otimes |+\rangle_3 \otimes |+\rangle_4 \otimes |+\rangle_5$ 2) apply standard entanglement procedure, the simultaneous conditional phase gates:
$S_{1\to 2}(\pi) \otimes S_{2\to 3}(\pi) \otimes S_{3\to 4}(\pi) \otimes S_{4\to 5}(\pi)$.
This concludes state preparation. (27)

3) measure qubits 1 to 4 in $\sigma_x$ i.e. apply the projector $$\prod_{i=1}^{4} P_{x,s_i}^{(i)} \text{ with } P_{x,s_i}^{(i)} = \frac{1+(-1)^{s_i}\sigma_x}{2}$$

to the previously prepared state.

By this procedure the state of a qubit initially stored at qubit site 1 is transferred to the qubit at site 5.

Now note that the measurements on qubits 1 and 2 commute with two of the entanglement operations $S(\pi)$:

$$[P_{x,s_1}^{(1)}, S_{3\to 4}(\pi)] = 0, [P_{x,s_2}^{(2)}, S_{3\to 4}(\pi)] = 0 \quad (28)$$
$$[P_{x,s_1}^{(1)}, S_{4\to 5}(\pi)] = 0, [P_{x,s_2}^{(2)}, S_{4\to 5}(\pi)] = 0$$

Thus, the procedure (27) to implement wire has the same effect as the following procedure:

1) prepare the state $|\psi_1\rangle_1 \otimes |+\rangle_2 \otimes |+\rangle_3 \otimes |+\rangle_4 \otimes |+\rangle_5$
2) apply a part of the standard entanglement procedure:
$S_{1\to 2}(\pi) \otimes S_{2\to 3}(\pi)$
3) measure qubits 1 and 2 in $\sigma_x$ i.e. apply the projector $$\prod_{i=1}^{2} P_{x,s_i}^{(i)} \quad (29)$$

4) apply the remaining part of the standard entanglement procedure: $S_{3\to 4}(\pi) \otimes S_{4\to 5}(\pi)$
5) measure qubits 3 and 4 in $\sigma_x$ i.e. apply the projector $$\prod_{i=3}^{4} P_{x,s_i}^{(i)}$$

In procedure (29) after initial preparation of a product state steps 2 and 3 realize a wire between qubits 1 and 3. The state that emerges is $|s_1\rangle_1 \otimes |s_2\rangle_2 \otimes |\Psi_3\rangle_3 \otimes |+\rangle_4 \otimes |+\rangle_5$ with $|\Psi_1\rangle$ and $|\Psi_3\rangle$ equivalent up to a unitary transformation $U_{1\to 3}$ in $\{1, \sigma_x, \sigma_z, \sigma_x\sigma_z\}$, depending on $s_1, s_2$: $|\Psi_3\rangle = U_{1\to 3}|\Psi_1\rangle$ Then, steps 4 and 5 realize a wire from qubit 3 to qubit 5. The state that finally results from the procedure is $|s_1\rangle_1 \otimes |s_2\rangle_2 \otimes |s_3\rangle_3 \otimes |s_4\rangle_4 \otimes |\Psi_5\rangle_5$, with $|\Psi_5\rangle = U_{3\to 5}|\Psi_3\rangle$ and $U_{3\to 5}$ in $\{1, \sigma_x, \sigma_z, \sigma_x\sigma_z\}$. Thus, $|\Psi_5\rangle = U_{1\to 5}|\Psi_1\rangle$, with $U_{1\to 5} = U_{3\to 5}U_{1\to 3}$. The procedure (27) does indeed implement a wire.

Further, the composed wire from qubit 1 to 5 can be imagined as first teleporting the qubit state from qubit 1 to qubit 3 and in a second step from qubit 3 to qubit 5. This picture is very convenient, since this is in accordance with the information flow in a quantum logic network. There is, however, no temporal order of teleportations in practice. All the necessary entanglement operations are carried out in a single step during state preparation and the one-qubit measurements to implement a wire can later be performed in arbitrary temporal order.

The following describes how to deal with the randomness of the measurement results. The standard form of the gates obtained via measurement on a cluster (15) and (18) is the gate desired times some possible successive $\sigma_x$- and $\sigma_z$-rotations applied to the output qubits. The collective product operator of all these $\sigma_x$- and $\sigma_z$-operators at a certain cut through the quantum logical network will be denoted as the multi-local extra rotation $U_\Sigma$ at this cut. By use of the relations (32) and (31) the unwanted extra rotations can be pulled trough the quantum logic network and summed up as one single multi-local unitary transformation applied to output state of the gate. This single local unitary transformation depends only upon the measurement outcomes obtained by imprinting the logic network on the state; it is known. Therefore, it can be corrected before the readout by a counter transformation. In other words, the bases for the readout measurements may need to be changed or, if not, at least the results of the readout measurements must be interpreted differently.

For the CNOT gate we use the following notation:

$$CNOT(t_{in}\to t_{out}, c) = |0\rangle\langle 0|_c \otimes 1^{(t_{in}\to t_{out})} + |1\rangle\langle 1|_c \otimes \sigma_x^{(t_{in}\to t_{out})} \quad (30)$$

with $\sigma_x^{(t_{in}\to t_{out})} = |0\rangle_{t_{out}}\langle 1|_{t_{in}} + |1\rangle_{t_{out}}\langle 0|_{t_{in}}$. A target qubit $t_{in}$ is XORed with a control qubit c and thereby transferred to $t_{out}$. In the implementation discussed so far, the control qubit c remains at its site.

Now, for the CNOT and for 1-qubit rotations the following relations hold:

$CNOT(a\to b,c)\sigma_x^{(a)} = \sigma_x^{(b)}CNOT(a\to b,c)$ $CNOT(a\to b,c)\sigma_z^{(a)} = \sigma_z^{(b)}\sigma_z^{(c)}CNOT(a\to b,c)$ $CNOT(a\to b,c)\sigma_x^{(c)} = \sigma_x^{(b)}\sigma_x^{(c)}CNOT(a\to b,c)$ $CNOT(a\to b,c)\sigma_z^{(c)} = \sigma_z^{(c)}\sigma_z^{(c)}CNOT(a\to b,c) \quad (31)$ and $U_x(\phi)\sigma_x = \sigma_x U_x(\phi)$ $U_x(\phi)\sigma_z = \sigma_z U_x(-\phi)$ $U_z(\phi)\sigma_x = \sigma_x U_z(-\phi)$ $U_z(\phi)\sigma_z = \sigma_z U_z(\phi) \quad (32)$ Thus, the unwanted extra rotations $\sigma_x$ and $\sigma_z$ can be pulled through the logic network to act upon the output state. For an illustration of this matter, see FIG. 8.

Figure 8:
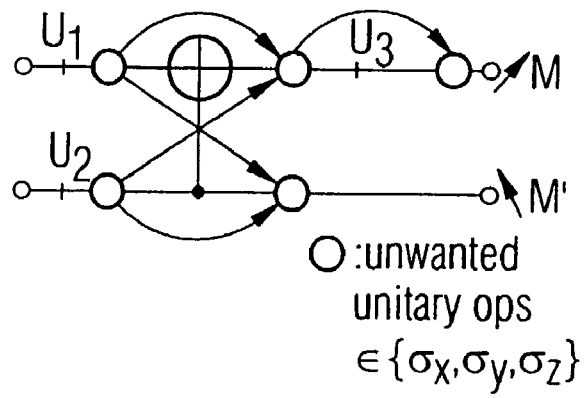
FIG. 8 is a schematic diagram which shows an example how unwanted extra rotations can be pulled through a network.

As outlined in FIG. 8, the unwanted extra rotations $(\bigcirc)\sigma_x$ and $\sigma_z$ are pulled through the lattice. Their occurrence depends on measurements of qubits on the left side of the actual gate, i.e. of qubits which sit at an earlier instant of the information flow.

As relations (32) show, pulling an extra rotation $\sigma_x$, $\sigma_z$ through a 1-qubit rotation may change the rotation angle of the latter. In particular, we observe $$U_x(\xi)U_z(\eta)U_x(\zeta)\sigma_x = \sigma_x U_x(\xi)U_z(-\eta)U_x(\zeta)$$

$$U_x(\xi)U_z(\eta)U_x(\zeta)\sigma_z = \sigma_z U_x(-\xi)U_z(\eta)U_x(-\zeta) \quad (33)$$

A situation which we certainly want to avoid is that the rotation angle of a rotation in the quantum logic gate depends on extra rotations $\sigma_x$, $\sigma_z$ of which we have no control. The occurrence of these extra rotations is inferred by measurement results on some qubits, and these results are random.

Therefore, in order to perform the correct rotation we must figure out which of the rotations $\sigma_x$ and $\sigma_z$ are present at the input of the 1-qubit rotation we want to perform. To do that all potential extra rotations that may occur are pulled through the lattice by use of (31), (32) to see which measurements have an impact on the input qubit of the rotation to perform. These qubits have to be measured before any of the qubits implementing the rotation $U_R(\xi, \eta, \zeta)$ is measured.

This imposes an order in which the qubits implementing the quantum logic network must be measured to accomplish the desired quantum operation. Then we know which extra rotations are "in the pipeline" and can account for them. The existence of some temporal ordering between measurements is not fundamentally new since we found that even for an isolated 1-qubit rotation according to (14) the order in which the measurements have to be performed is fixed. The new aspect is only that the ordering is not confined within the one-qubit gates but there exists a partial ordering of measurements on the whole network.

We call qubits $p_i$ in the past of qubit q, $p_i < q$, if measurements on the $p_i$ have an impact on q, i.e. will, depending on the measurement results, cause extra rotations $\sigma_x$, $\sigma_z$ acting upon qubit q. If qubit q belongs to the qubits implementing a one-qubit rotation then all qubits $p_k$ with $p_k < q$ must be measured before qubit q is measured. By the way logic networks are constructed one can never have $p < q$ and $q < p$ at the same time, where the respective qubits p and q belong to the implementation of some gates. If that was so, the logic network contained a loop; but it never does.

As a consequence of equation (33) the procedure (14) for isolated 1-qubit rotations has to be modified if the rotation becomes part of a quantum logic network. The complete procedure to implement a rotation $U_R(\xi, \eta, \zeta)$ is
1) Let the qubits implementing the rotation be $q_1, \ldots, q_5$. Measure all qubits $p_k$ for which $\exists_{q_i} | i=1 \ldots 5: p_k > q_i$. The measurement results at $\{p_k\}$ infer a rotation $\sigma_x^{s_x} \sigma_z^{s_z}$ with $s_x, s_z \in \{0, 1\}$ acting upon qubit $q_1$.
2) Define angles $\xi'$, $\eta'$, $\zeta'$ with $$\xi' = (-1)^{s_z}\xi, \eta' = (-1)^{s_x}\eta, \zeta' = (-1)^{s_z}\zeta \quad (34)$$

Perform the rotation $U_R(\xi', \eta', \zeta')$ according to procedure (14).

Although we have demonstrated that a universal set of quantum logic gates can be implemented on cluster states by one-qubit measurements and that these gates can be combined to networks, the implementation discussed so far poses some unresolved aspects that are addressed and solved in the following.

As can be seen from the implementation of the CNOT, it may occur for some gates that one of the output qubits of the gate is carried by the same lattice site as was the respective input qubit. In the example of the CNOT this is the case for the control qubit. As displayed in FIG. 9a, by proceeding in the so far explained manner one runs into trouble. The measurements have to be performed in such a way that the in/out-qubit is confined to its site and there is no direction left to dock on a wire and transport the qubit to another site. Thus, although present, the qubit is lost for the computation. For a quantum logic network we must demand, however, that we keep all the qubits available for the computation.

This problem is solved by the T-piece displayed in FIG. 9b. By, combining the T-piece with a gate the sites for the input- and output-qubit that formerly coincided can be separated, see FIG. 9c.

Let $$i = \sum_{l=1}^{d} n_l i_l$$

with integers $n_l$, $l=1 \ldots d$ be some vector pointing at a lattice site. We define the even (odd) sublattice the set of lattice sites for which $$\sum_{l=1}^{d} n_l \bmod 2 = 0(1).$$

The elementary piece of wire takes the qubit two lattice sites further. All quantum wires that can be constructed out of the elementary wire piece take a qubit from a site of the even (odd) sublattice to another site of the even (odd) sublattice. It is in this manner not possible to access the other sublattice. As will become clear when further examples for quantum gates are given, the input qubits (as well as the output qubits) may be located on different sublattices. Therefore it is necessary to provide a piece of wire by which the qubit can transferred from a site on one sublattice to a site in the other.

The piece of wire required for that purpose is the knight. It is displayed in FIG. 10. The knight consists of a chain of 6 qubits. Let qubit 1 be the input and qubit 6 be the output qubit. To transfer a qubit from site 1 to site 6, qubits 1 and 5 have to be measured in $\sigma_x$, and qubits 2, 3 and 4 in $\sigma_y$. In FIG. 10 the knight is displayed.

In two dimensions there is an additional problem. Suppose a cluster is intersected by a wire for a certain qubit. Further there are two other qubits which are located on different sides with respect to the wire. One wants to perform a CNOT between the two latter qubits. Is that possible? I.e. Can a wire be crossed?

Figure 12A:
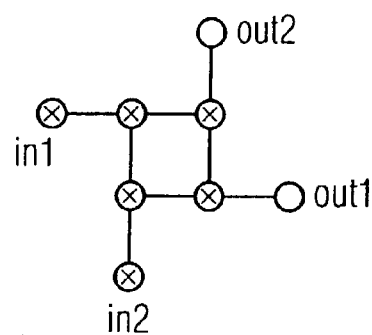
FIGS. 12a and 12b are schematic diagrams which show an example for a crossing, which involves a conditional phase gate.
Figure 12B:
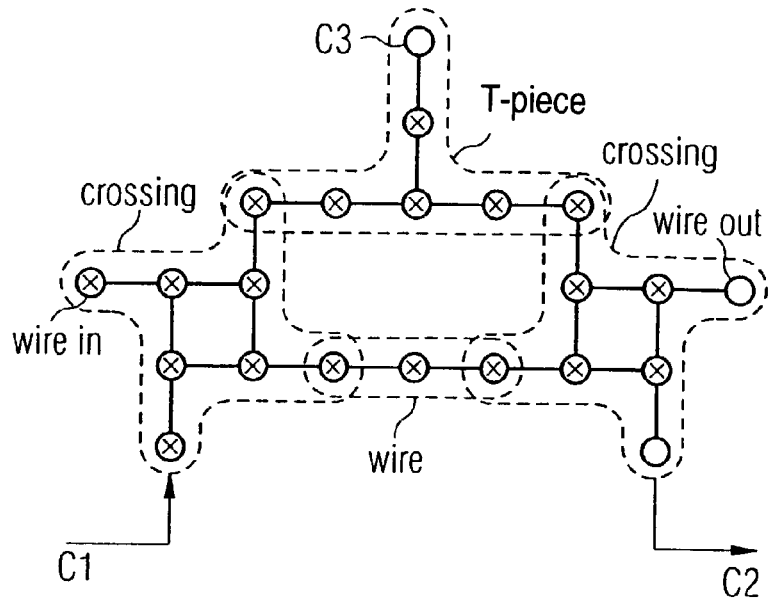
Figure 18:
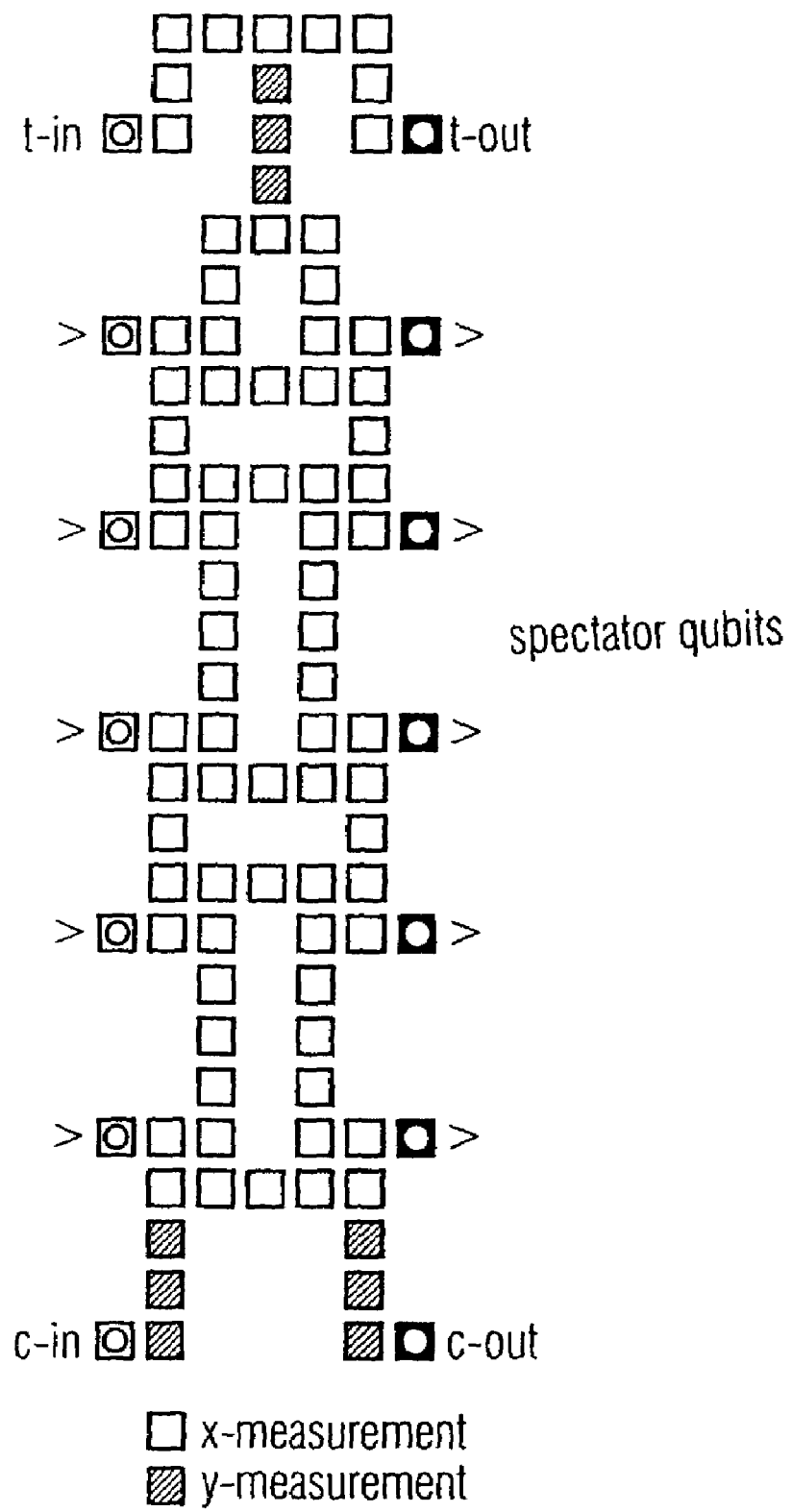
FIG. 18 is a schematic diagram which shows a CNOT-gate between arbitrarily distant qubits.

One solution which was found to that question is that one can cross but has to cross back, see FIGS. 11a and 11b. In the meantime one can use the traveling qubit to perform a gate by insertion of a T-piece, see FIG. 12b. FIG. 12a shows the implementation of a crossing which involves a conditional phase gate. FIG. 12b shows the implementation of the schematic solution in FIG. 11b on a cluster state. Qubit $c_3$ can be used e.g. as control qubit for a CNOT (then it has to be measured in a $\sigma_x$. Qubits $c_1$ and $c_2$ are the input and output qubits of the lower wire. Of course, this solution for conditional gates is not a necessary requirement, because already one-qubit rotations and next neighbor CNOT gates are universal since from the latter the general CNOT gate can be constructed. However, the use of the crossing piece leads to more economic solutions, see FIG. 18. In FIG. 18 a CNOT gate between arbitrarily distant qubits is shown. As will be explained later on, all necessary measurements can be performed simultaneously. Accordingly, the time required to perform the CNOT gate does not depend on the distance of the qubits.

It has been shown that a universal set of gates can be implemented. Nevertheless, it would be interesting to see how other gates look like. This is in particular the case for the conditional phase gate which is for instance required to implement a quantum Fourier transformation.

Figure 13:
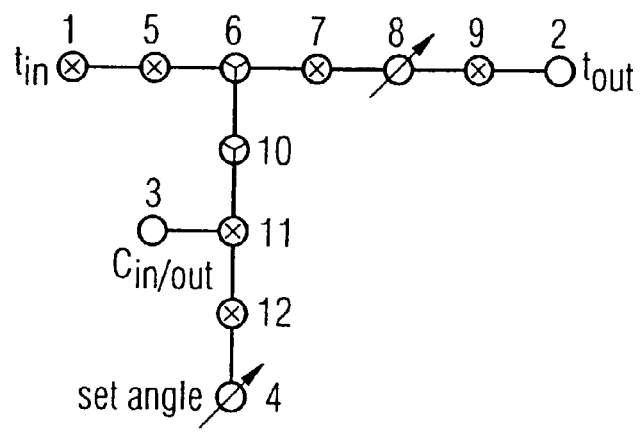
FIG. 13 is a schematic diagram which shows an example for a conditional phase gate.

In FIG. 13 a conditional phase gate is displayed. The gate bears the capability of adjusting the rotation angle to the desired value by two one-qubit measurements. The gate requires a cluster state of 12 qubits. The rotation angle is adjusted by measurements at qubits 4 and 8. Qubit 3 is input and output for the control qubit, qubit 1 the target input and qubit 2 the target output. Qubits 1, 5, 7, 9, 11, 12 are measured in $\sigma_x$ and qubits 6, 10 in $\sigma_y$.

To perform the conditional phase gate about the angle $\beta$ $$CPG(\beta) = |0\rangle_c \langle 0|_c \otimes 1^{(t)} + |1\rangle_c \langle 1|_c \exp(i\beta\sigma_z)^{(t)} \quad (35)$$

perform the following steps.

(i) Measure the qubits 1, 5, 6, 7, 9, 10, 11, 12 in the bases $$\text{qubit 1 in } B_1 = \left\{ \frac{|0\rangle_1 + |1\rangle_1}{\sqrt{2}}, \frac{|0\rangle_1 - |1\rangle_1}{\sqrt{2}} \right\} \quad (36)$$

$$\text{qubit 5 in } B_5 = \left\{ \frac{|0\rangle_5 + |1\rangle_5}{\sqrt{2}}, \frac{|0\rangle_5 - |1\rangle_5}{\sqrt{2}} \right\}$$

$$\text{qubit 6 in } B_6 = \left\{ \frac{|0\rangle_6 + i|1\rangle_6}{\sqrt{2}}, \frac{|0\rangle_6 - i|1\rangle_6}{\sqrt{2}} \right\}$$

$$\text{qubit 7 in } B_7 = \left\{ \frac{|0\rangle_7 + |1\rangle_7}{\sqrt{2}}, \frac{|0\rangle_7 - |1\rangle_7}{\sqrt{2}} \right\}$$

$$\text{qubit 9 in } B_9 = \left\{ \frac{|0\rangle_9 + |1\rangle_9}{\sqrt{2}}, \frac{|0\rangle_9 - |1\rangle_9}{\sqrt{2}} \right\}$$

$$\text{qubit 10 in } B_{10} = \left\{ \frac{|0\rangle_{10} + i|1\rangle_{10}}{\sqrt{2}}, \frac{|0\rangle_{10} - i|0\rangle_{10}}{\sqrt{2}} \right\}$$

$$\text{qubit 11 in } B_{11} = \left\{ \frac{|0\rangle_{11} + |1\rangle_{11}}{\sqrt{2}}, \frac{|0\rangle_{11} - |1\rangle_{11}}{\sqrt{2}} \right\}$$

$$\text{qubit 12 in } B_{12} = \left\{ \frac{|0\rangle_{12} + |1\rangle_{12}}{\sqrt{2}}, \frac{|0\rangle_{12} - |1\rangle_{12}}{\sqrt{2}} \right\}$$

and keep the measurement outcomes $s_1, s_5, s_6, s_7, s_9, s_{10}, s_{11}, s_{12} \in \{0, 1\}$. The result $s_i = 0(1)$ is obtained if the respective qubit is projected into the former (latter) eigenstate of the basis $B_i$.

(ii) Measure the qubits 4 and 8 in the bases $$\text{qubit 4 in } B_4 = \left\{ \begin{array}{l} \cos\frac{\beta}{2}|0\rangle_4 + \sin\left(\frac{\beta}{2}(-1)^{1+s_{10}+s_{11}+s_{12}}\right)|1\rangle_4 \\ -\sin\left(\frac{\beta}{2}(-1)^{1+s_{10}+s_{11}+s_{12}}\right)|0\rangle_4 + \cos\frac{\beta}{2}|1\rangle_4 \end{array} \right\} \quad (37)$$

qubit 8 in $B_8$ =

$$\left\{ \frac{|0\rangle_8 + \exp(i\beta(-1)^{1+s_5+s_7})|1\rangle_8}{\sqrt{2}}, \frac{|0\rangle_8 - \exp(i\beta(-1)^{1+s_5+s_7})|1\rangle_8}{\sqrt{2}} \right\}$$

and keep the measurement results $s_4$ and $s_8$.

By this procedure the desired conditional phase gate (35) is realized. Depending on the measurement results, there are additional $\sigma_x$ and $\sigma_z$. Rotations applied to the output qubits which can, as in the previous cases, accounted for.

In the following we address the question: What to do if the computation one wants to perform is so extensive that the cluster states which can practically be generated are just not big enough for it?

A way out of this situation is as follows. The computation is split into a succession of simpler computations each of which alone can be performed with the cluster state at hand. After generation of the cluster one performs the first part of the computation as usual, but performs no readout measurements. The quantum state representing the intermediate result of the computation is spread over a number of qubits (equal to the number of input qubits) on the lattice. Note that by construction it can never occur that two qubits of the intermediate state are next neighbors on the lattice. The remaining qubits are all measured out.

Next, the remaining qubits are prepared in |+> and thereafter the simultaneous entanglement operation (conditional phase gate between all pairs of next neighbors) is performed. Then, the measurements implementing the second (later third, fourth, . . . ) part of the quantum logic network are carried out. This procedure (preparing the remaining qubits, entanglement operation and measurements to imprint the next part of the quantum logic network) is iterated until the whole computation has been carried out.

Figure 14:
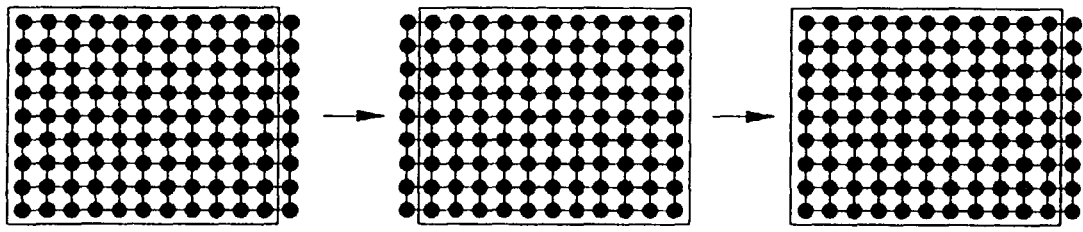
FIG. 14 is a schematic diagram which shows an information processing scheme with a cluster of finite size wherein the entanglement operation is iterated over a plurality of cycles.

In FIG. 14 a rectangular cluster of qubits is shown. Thereby, the shaded region describes those qubits which are measured during one cycle. As can be seen one column remains unmeasured and thus represents the input information for the subsequent cycle. The entanglement operation is performed on whole cluster including the unmeasured qubits, so that the input information is available for further processing.

Performing a quantum computation in this extended framework is in a way like doing a calculation on the blackboard. By moving ahead one uses up the blackboard. Once one reaches the bottom one wipes out the writing but keeps the last line and goes on. A merit of this modified procedure in which the cluster of qubits is successively re-entangled is that it keeps low the amount of decoherence. If the cluster is small and the quantum correlations are successively recreated among its qubits then the cluster qubits have been exposed to decoherence only for a short time before they are measured. In this way, the probability for errors due to interaction with environmental degrees of freedom is reduced. Then, known quantum-error correction techniques can be applied.

Another extension to the presented scheme is that it works with permanent Ising interaction, too. For the computational scheme as it was described above, it was shown that the creation of a cluster state—being the resource quantum state in the described scheme—can be achieved with a controllable Ising-type interaction, in particular such an Ising-type interaction which can be switched on and off. This requirement of controllability can be relaxed to an Ising-type interaction of constant strength, i.e. one that does not vary with time and need not, in particular, to be switched on and off. This case is more common in nature and also easier to implement in manufactured systems. Note that there is a time period $T_s$ in which a product state of qubits is transformed into a cluster state via the unitary transformation S, generated by the Ising Hamiltonian. Since SS=1, a quantum state is brought back to itself in a time of 2 $T_s$, if the Ising interaction continues.

With permanent Ising interaction the computation can, for example, be run as follows: At time 0 each qubit is projected into an eigenstate of $\sigma_x$, via measurement. Then, waiting for a time $T_s$, this initial product state evolves into a cluster state. Now, the measurements can be performed at time instances which are an odd multiple of $T_s$, i.e. at $T_s$, 3 $T_s$, 5 $T_s$, 7 $T_s$ and so on. This results in a stroboscopic measurement sequence. In this relaxed scheme we assume that the measurements can be performed on a time scale much smaller than $T_s$.

A quantum computer based on quantum mechanical cluster states can for example be realized with atoms trapped in optical lattices. Effective cooling is essential. Initial state preparation and the simultaneous conditional gate to create the necessary entanglement in the quantum state can be performed by means described in Jaksch et al. (Phys. Rev. Lett 82, 1975, 1999). To permit individual measurement of qubits different optical lattices can be used for cooling and trapping of the atoms and for the entanglement operation (Scheunemann et al., Phys. Rev. A 62, 051801(R), 2000; Weitz, IEEE J. Quant. Electronics 36, 1346, 2000).

An advantageous way to perform the discussed scheme of quantum computation via one-qubit measurements which goes beyond the network picture is discussed in the following.

In the scheme of quantum computation via measurements we found the byproduct multi-local rotation $$U_\Sigma = \prod_{i=1}^{n} \sigma_z^{(i)z_i} \sigma_x^{(i)x_i} \tag{38}$$

where $x_i$, $z_i$ in $\{0,1\}$; for all $i=1 \ldots n$. The binary values $x_i$ and $z_i$ can be arranged in a 2n-component binary vector I $$I = \begin{pmatrix} z_1 \\ \vdots \\ z_n \\ x_1 \\ \vdots \\ x_n \end{pmatrix} \tag{39}$$

Equation (38) defines an isomorphism between I and $U_\Sigma$. The two quantities contain the same information. In the so far discussed scheme, the byproduct rotation $U_\Sigma$ is important because it determines the measurement bases to perform the one-qubit rotations in the cluster realization of a quantum logic network correctly. The appearance of the quantity $U_\Sigma$ is, in fact, responsible for the temporal ordering of the measurements. $U_\Sigma$ or I, respectively, is a central quantity in the scheme on which a flow picture of information can be based.

This is a scheme of quantum computation via one-qubit measurements. Hence, all information extractable from a quantum computation must be contained in the measurement results. These results are, of course, classical quantities. But, as we have only classical quantities at hand, the carrier of the flowing information will be a classical quantity. The processing, however, is still quantum since what is used to manipulate the information are quantum correlations. The carrier of flowing information is the 2n-component binary vector I.

The scheme of quantum computation via one qubit measurements consists of three steps, preparation, the true computation and classical post-processing. The first step comprises resource creation and initialization. The second step consist of a temporal succession of sets $M_i$ of simultaneous measurements, where earlier sets influence later ones. The output of the quantum computation (corresponding to the readout in the framework of quantum logic networks) is calculated from all the measurement results. In more detail, the three steps are:

(i) Creation of the resource for the computation, the cluster state of sufficiently many qubits. Initialization of the quantum circuit: measuring all those qubits, of which the Pauli spin operators $\sigma_x$, $\sigma_y$, $\sigma_z$ are to be measured. Those qubits of which nontrivial linear combinations of the Pauli spin operators (eg. $\cos(\alpha)\sigma_x \pm \sin(\alpha)\sigma_y$ are to be measured, remain unmeasured at this stage.

(ii) The so far unmeasured qubits are grouped into sets $Q_i$. The measurements to be performed on the qubits in $Q_i$ form corresponding sets $M_i$. The qubits within one set can be measured at the same instant of time, whereas between the sets of equal-time measurements $M_i$ there is a temporal ordering. The sets of measurements $M_i$ are carried out one after the other. Before each step of performing measurements, the type—i.e. the direction—of each measurement in the actual set $M_i$ is calculated from the measurement results of measurements in earlier sets $M_j$, $1 \leq j < i$.

(iii) The readout is calculated from the results of all the measurements.

Figure 15A:
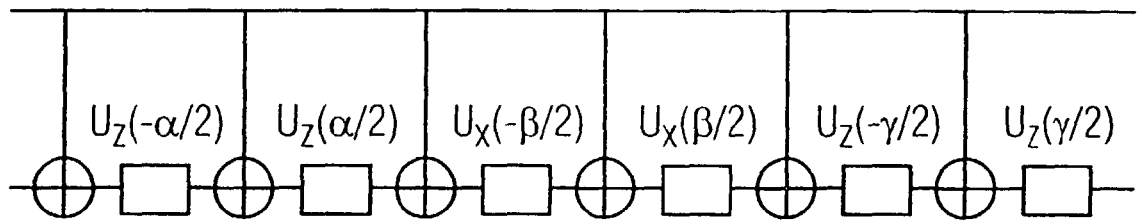
FIGS. 15a and 15b are schematic diagrams which show a quantum logic network and a corresponding initialized circuit on a cluster state.
Figure 15B:
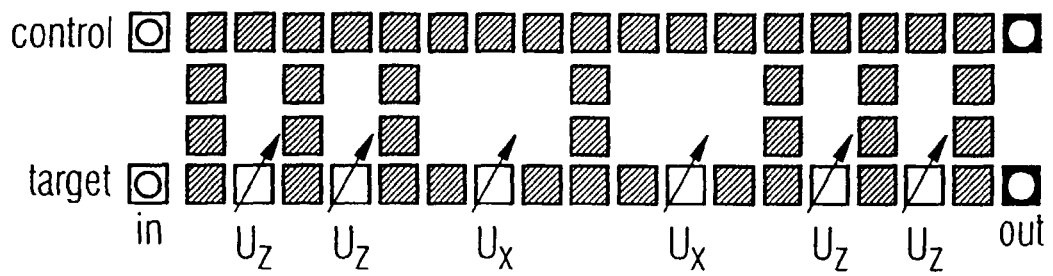

To initialize a quantum circuit on a cluster state, all measurements in the $\sigma_x$, $\sigma_y$ and $\sigma_z$-eigenbasis have to be performed. This is illustrated in FIGS. 15a and 15b for the example of a general controlled one-qubit rotation. FIG. 15a shows a quantum logic network for a general conditional rotation, resolved in CNOT-gates and one-qubit rotations. The general rotation is parameterized by the three Euler angles $\alpha$, $\beta$ and $\gamma$. FIG. 15b shows the corresponding realization of this network on a cluster state. Each square corresponds to a lattice qubit. The circuit is already initialized: all qubits to be measured in the $\sigma_x$-eigenbasis have already been measured (displayed in shaded gray). The qubits which are to be measured in tilted bases remain yet unmeasured. They are displayed as framed boxes with arrows.

Figure 16A:
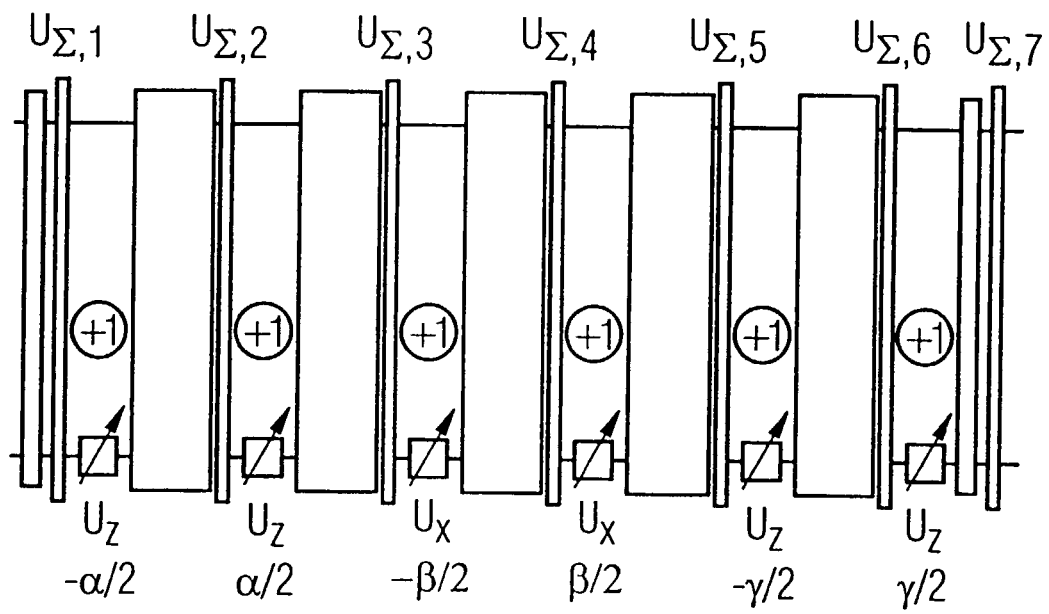
FIGS. 16a and 16b are schematic diagrams which show an example for the backward propagation of the byproduct rotations.

The measurements in the initialization step produces byproduct rotations $U_{\Sigma,i}$ preceding the unmeasured qubits, see FIG. 16a. FIG. 16a shows a schematic picture of a quantum computer via measurements after initialization. Zones that realize wires, CNOT-gates and Hadamard-transformations (gray area) have been measured. As a result, at the output side of each such zone, there appear byproduct rotations $U_{\Sigma,i}$ (black vertical bar).

Figure 16B:
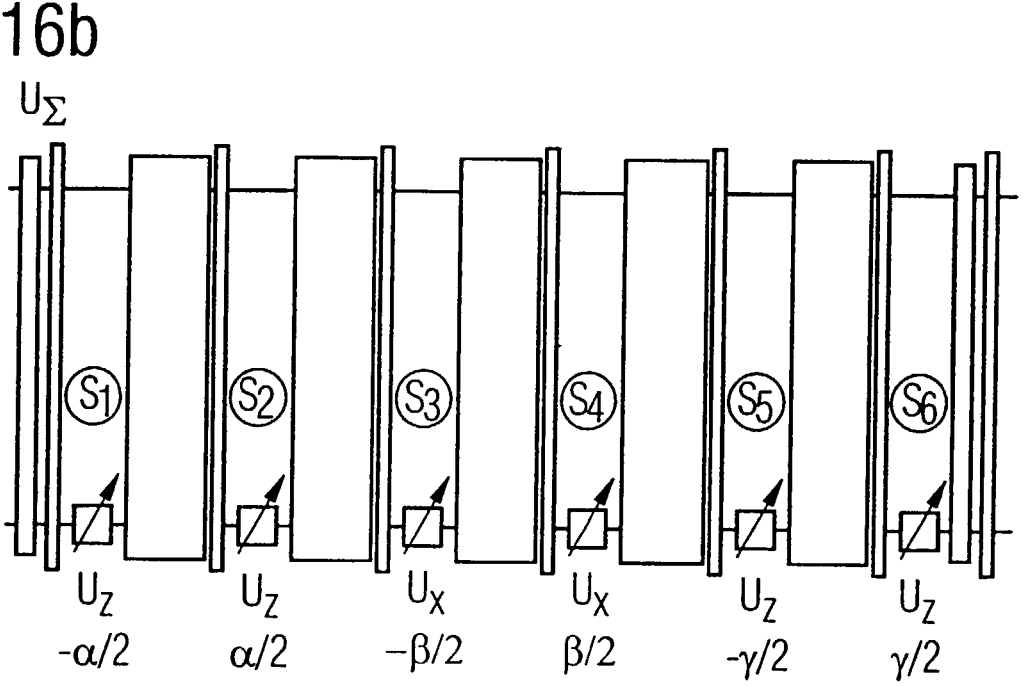

The yet unmeasured qubits, displayed as framed boxes with arrows, belong to the realization of one-qubit-rotations in the network model. Using the propagation relations (33) and the inverse of the relations (31), the spread byproduct rotations $U_{\Sigma,i}$ are propagated backwards and accumulate to $U_\Sigma$ at the side that would be the input side of a quantum logic network (left bar), see FIG. 16b. The backward propagation affects the signs $s_i$ of the angles of the rotations yet to be implemented. That may change the sign of the measurement angle of the so far unmeasured qubits as indicated in the cycles.

Passing by unmeasured qubits during their backward propagation, the $U_{\Sigma,i}$ may reverse the sign of the measurement angle (in the x-y-plane) of the yet to be measured qubits. This relative sign can be taken account of by a quantity $(-1)^{si}=\pm 1$ for each unmeasured qubit. For each yet-to-be-performed measurement, after completed backward propagation of the $U_{\Sigma,i}$ the measurement angle $\zeta_i$ belonging to the unmeasured qubit i changes into $(-1)^{si}\zeta_i$. This is one half of the initialization. The other half is setting the input value $I_{in}$ of the information vector I. $I_{in}$ is the binary vector that corresponds via Def. (39) and isomorphism (38) to $U_{\Sigma}$.

The sets $Q_i$ are uniquely defined. The measurements to be performed are specified by their measurement directions. The directions of measurements in the sets $M_i$ required for this scheme are all in the x-y plane and thus specified each by a single angle. These angles are determined by the computation to be realized up to a sign factor $\pm$. These sign factors must be known to be able to perform the correct measurements. The sign factors are determined by the computation to be realized and the results of earlier measurements. This is how earlier measurements influence later ones.

Figure 17A:
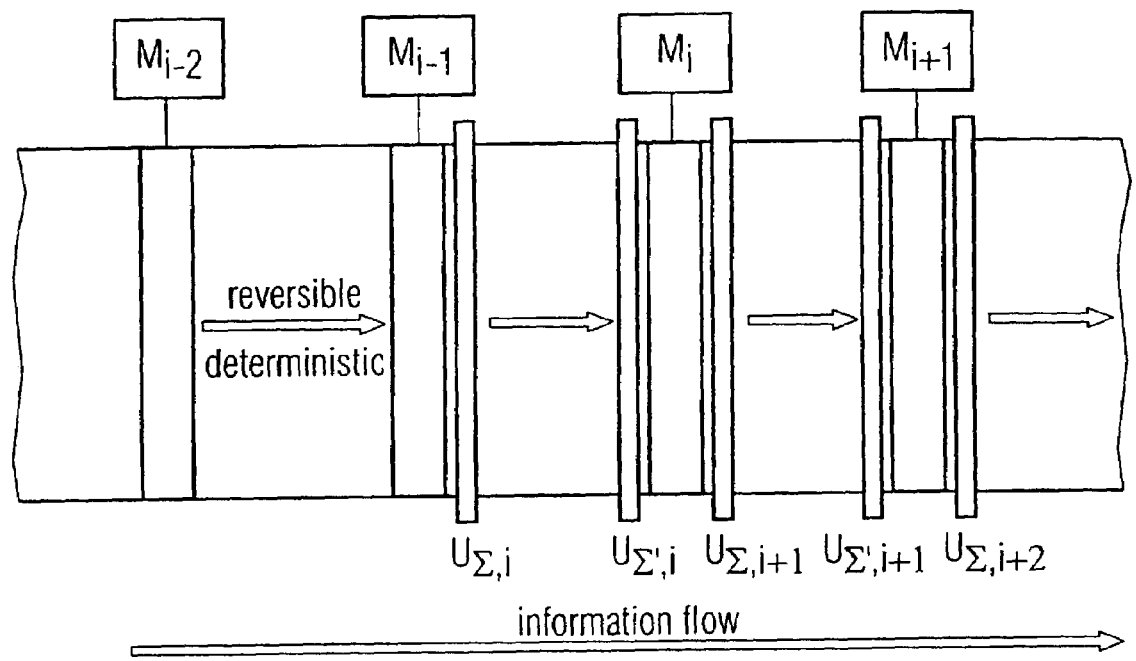
FIGS. 17a and 17b are schematic diagrams which illustrate the information flow in a quantum computer via measurements.

In more detail, not all the measurement results need to be kept. The amount of classical information required per logical quantum bit is just two bits. In total, all required classical information is contained in the 2n-component vector I. The information vector I passes through alternating sections of deterministic reversible evolution and of nondeterministic evolution induced by the sets of equal-time measurements $M_i$. The evolution in the reversible section is in accordance with the propagation relations (31) (see FIG. 17a). In FIG. 17a the information flow carried by the $U_{\Sigma,i}$s is displayed. The flow includes alternating periods of reversible deterministic evolutions (shaded gray areas) and indeterministic evolutions due to the measurements (framed boxes).

The passing information vector I and the sets of measurements $M_i$ mutually influence each other. The vector I determines which observables are to be measured. It therefore decides which quantum correlations are retained and used for information processing. More precisely, the measurement angle $\zeta_{k,M}$ in the x-y-plane is given by $$\zeta_{k,M}=(1)^{I_x(i)}\zeta_k$$

or:

$$\zeta_{k,M}=(1)^{I_x(i)}\zeta_k \quad (40)$$

The upper line in equation (40) holds for the case the measurement at the lattice qubit k implements a rotation about the z-axis on the logical qubit i and the lower for the case of a rotations about the x-axis. $I_x(i)$ and $I_z(i)$ denote the i-th component or the z- and x-part of I, respectively.

Figure 17B:
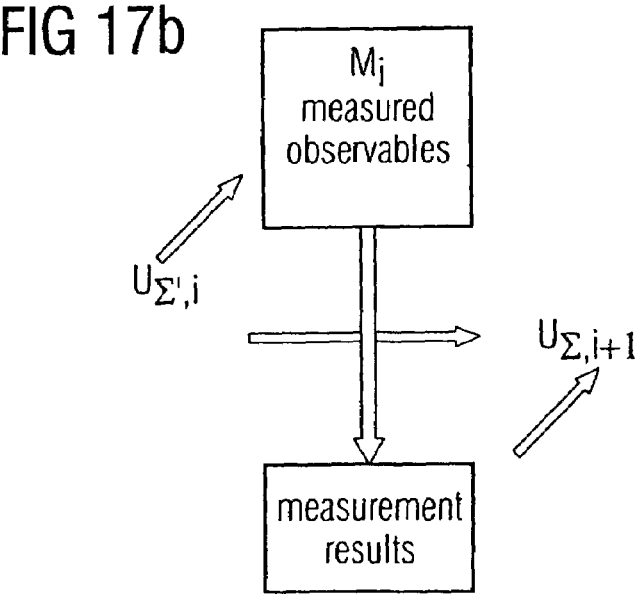

On the other hand, the results gained by the set of measurements $M_i$ update the information vector I $$I_{i+1}=\Delta I(\text{results}(M_i))+I_i' \quad (41)$$

where I' denotes an information vector I in front of a measurement section, thus after propagation through a reversible CNOT & Hadamard section, and I without prime the information vector after the measurement section and before the next reversible section, see FIG. 17b. As outlined in FIG. 17b, the byproduct rotation $U_{\Sigma',i}$ corresponding to the information vector I in front of a measurement section determines which observables are being measured in the measurement section (framed box). In turn, the byproduct rotation $U_{\Sigma,i+1}$ corresponding to the information vector I, after the measurement section is influenced by the results of the measurements.

After completing the measurements there is not much left to do. After the final update of the information vector I, one half of I, depending on the situation either the x-part or the z-part, represent the readout that is analogous to the readout within the network scheme. The other half can, at this stage, be discarded.

In this scheme, the logical depth is for many algorithms strictly smaller than in quantum logic networks and thus the model is more powerful. In this context, the logical depth is defined as the minimum number of sets $Q_i$—consisting of those qubits which can be measured at the same time. For example, circuits in the Clifford group, i.e. such ones whose network realization involves only CNOT gates, Hadamard gates and $\pi/2$-phase gates, can be performed in a single time step. All measurements needed to implement the circuit can be performed at the same time. This arises because the possible extra rotations are all in the Pauli group and the Clifford group is the normalizer of the Pauli group. Therefore, extra rotations remain in the Pauli group when conjugated with respect to an element in the Clifford group. Hence, the extra rotations can be propagated through the quantum logic network to act upon the output state (in network terminology) without having any effect on the gates. The Clifford group of circuits is of practical relevance since it contains many coding circuits. As examples, the coding circuit of a 5-qubit quantum error correcting code and of Shor's original 9-bit code (P. Shor, U.S. Pat. No. 5,768,297) are shown in FIGS. 19a and 19b.

FIG. 19a shows how one qubit coming from below is coded into 5 qubits. Thereby, the information carried by the qubit is delocalized over 5 qubits. Accordingly, the risk of an information loss due to single qubit error within the five qubits is reduced considerably.

The circuit displayed uses crossing pieces as displayed in FIGS. 12a and 12b and implements the 5 qubit error code given by C. H. Benett et al., Phys. Rev. A54, 3824 (1996). FIG. 19b shows a similar circuit implementing the 9 qubit code given by Shor.

We have presented a new method for quantum computing which is different from quantum logic networks but at least as powerful. Universality of quantum computing on cluster states via one-qubit measurements has been proved. In particular, it was shown that a universal set of quantum gates, arbitrary 1-qubit rotations and the CNOT-gate, can be implemented on cluster states, and the gates can be combined to quantum logic networks.

The material displayed herein is by no means solely one particular way of doing an equivalence proof, it is also a handbook of how to practically implement a quantum computer on a cluster state. To imprint a quantum logic network on a cluster state one has only to perform a sequence of one-qubit measurements.

The advantage of quantum computing with cluster states in comparison with a quantum logic network is that during the course of the computation only simple one qubit measurements are needed and no entanglement is created by performing quantum logic gates. All the entanglement that is needed in the course of a quantum computation is provided by the initial resource state. In quantum logic networks the situation is different; here, entanglement is created during the course of the computation by the use of quantum logic gates. But the gates will be much harder to implement than 1-qubit measurements.

The realization of a quantum computer on cluster states has another merit. It is expected that in the near future large cluster states can be created, for instance with ultra-cold atoms trapped in optical lattices or similar system. This provides one with a scalable system for quantum computing.

In this scheme, the logical depth is for many algorithms strictly smaller than in quantum logic networks. This reduces the time during which qubits are exposed to decoherence and also the total computation time.

The cluster state is used up by the computation since the measurements destroy it. For a result of a quantum computation one has to pay with entanglement. In this view, cluster states form a resource for, quantum computation.

The principle of quantum computation with cluster states can be summed up in the following "equivalences":

| cluster state = one way quantum computer |
| --- |
| set of 1-particle measurements = program |

From the above, it should be understood that the embodiment described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

We claim:

1. A method for quantum computing, the method which comprises:
    providing a plurality of quantum systems each having at least two different states;
    preparing a resource state of the quantum systems wherein all of the quantum systems are in a common superimposed entangled state;
    in the resource state, making one-system measurements on the quantum systems;
    processing outcomes of the one-system measurements; and
    outputting a result of the processing.

2. The method according to claim 1, which comprises providing the quantum systems as microscopic particles.

3. The method according to claim 2, which comprises providing one of atomic systems and molecular systems as the microscopic particles.

4. The method according to claim 2, which comprises providing a space lattice for accommodating the microscopic particles at given positions.

5. The method according to claim 4, which comprises filling the space lattice with the microscopic particles such that the microscopic particles are provided at regularly distributed positions in the space lattice.

6. The method according to claim 4, which comprises filling the space lattice with the microscopic particles such that the microscopic particles are provided at irregularly distributed positions in the space lattice.

7. The method according to claim 2, which comprises creating the resource state by preparing all of the quantum systems in a state |+> and performing a conditional phase gate S obeying $S_{c \to n}(\pi) = |0>_c <0|_c \otimes \sigma_=^{(n)} + |1>_c <1|_c \otimes 1^{(n)}$ between all pairs of next-neighboring ones of the microscopic particles, where c indicates a central qubit and n indicates a neighboring qubit.

8. The method according to claim 2, which comprises providing the microscopic particles as extremely cooled neutral atoms in a standing wave laser field forming a lattice.

9. The method according to claim 8, which comprises generating a two-dimensional laser field.

10. The method according to claim 8, which comprises generating a three-dimensional laser field.

11. The method according to claim 8, which comprises cooling the atoms by using a standing wave laser field having a wavelength that is a multiple of a wavelength of the standing wave laser field forming the lattice.

12. The method according to claim 2, which comprises generating the resource state simultaneously for all of the microscopic particles.

13. The method according to claim 1, which comprises performing the information processing at least partially by imprinting a quantum logic network on the resource state.

14. The method according to claim 13, wherein the step of imprinting the quantum logic network on the resource state includes:
    measuring those of the quantum systems that are present in the resource state but not required for the quantum logic network in a $\sigma_z$-basis; and
    measuring those of the quantum systems that are needed for the quantum logic network in an appropriate order and in an appropriate basis.

15. The method according to claim 1, wherein the step of performing the information processing includes measuring a first group of the quantum systems thereby writing input information into an entangled state of remaining ones of the quantum systems.

16. The method according to claim 1, which comprises setting a first group of the quantum systems into a given quantum-mechanical state representing an input information prior to performing the step of preparing the resource state.

17. The method according to claim 1, wherein the step of performing a quantum information processing includes:
    initializing a quantum circuit by measuring all those of the quantum systems for which Pauli spin operators $\sigma_z$, $\sigma_y$ and $\sigma_x$ are to be measured;
    grouping yet unmeasured ones of the quantum systems into sets $Q_i$ and grouping measurements yet to be performed on the quantum systems in $Q_i$ into corresponding sets of measurements $M_i$ each being formed of measurements that can be performed simultaneously; and
    simultaneously performing the measurements in one set $M_i$, wherein a type of measurement is determined by measurement results of measurements belonging to earlier sets $M_j$.

18. The method according to claim 1, which comprises iterating the steps of preparing a resource state and performing an information processing in the resource state for a plurality of cycles such that during each of the cycles a respective group of the quantum systems remains unmeasured and a quantum mechanical state of the respective group of the quantum systems represents an input information for a next one of the cycles.

19. A method for quantum computing, the method which comprises:
    providing a plurality of quantum systems each having at least two different states;
    preparing a resource state of the quantum systems wherein all of the quantum systems are in a common superimposed entangled state, the resource state being a cluster state;
    in the resource state, making one-system measurements on the quantum systems;

processing outcomes of the one-system measurements; and outputting a result of the processing.

20. A method for quantum computing, the method which comprises:

providing a plurality of quantum systems each having at least two different states;

preparing a resource state of the quantum systems wherein all of the quantum systems are in a common superimposed entangled state, the resource state being a state that can be brought into a form of a cluster state by one-system measurements;

in the resource state, making one-system measurements on the quantum systems;

processing outcomes of the one-system measurements; and outputting a result of the processing.

* * * * *